(12) United States Patent
Honda et al.

(10) Patent No.: US 8,307,149 B2
(45) Date of Patent: Nov. 6, 2012

(54) NONVOLATILE MEMORY DEVICE INCLUDING A LOGICAL-TO-PHYSICAL LOGIG-TO-PHYSICAL ADDRESS CONVERSION TABLE, A TEMPORARY BLOCK AND A TEMPORARY TABLE

(75) Inventors: Toshiyuki Honda, Kyoto (JP); Hirokazu So, Osaka (JP); Shigekazu Kogita, Osaka (JP); Masayuki Toyama, Osaka (JP); Seiji Nakamura, Osaka (JP); Masato Suto, Osaka (JP); Manabu Inoue, Osaka (JP)

(73) Assignee: Panasonic Corporation, Osaka (JP)

( * ) Notice: Subject to any disclaimer, the term of this patent is extended or adjusted under 35 U.S.C. 154(b) by 443 days.

(21) Appl. No.: 11/912,700

(22) PCT Filed: Dec. 7, 2006

(86) PCT No.: PCT/JP2006/324449
§ 371 (c)(1),
(2), (4) Date: Oct. 26, 2007

(87) PCT Pub. No.: WO2007/066720
PCT Pub. Date: Jun. 14, 2007

(65) Prior Publication Data
US 2009/0049229 A1 Feb. 19, 2009

(30) Foreign Application Priority Data
Dec. 9, 2005 (JP) .................. 2005-355907

(51) Int. Cl.
*G06F 12/00* (2006.01)
*G11C 11/34* (2006.01)
(52) U.S. Cl. .................. 711/103; 711/101; 365/185.12
(58) Field of Classification Search .................. 711/103, 711/101; 365/185.12
See application file for complete search history.

(56) References Cited

U.S. PATENT DOCUMENTS

| 5,530,938 | A | 6/1996 | Akasaka et al. |
| 6,141,249 | A | 10/2000 | Estakhri et al. |
| 6,275,436 | B1 * | 8/2001 | Tobita et al. .................. 365/221 |
| 6,430,650 | B1 | 8/2002 | Miyauchi |
| 7,032,065 | B2 * | 4/2006 | Gonzalez et al. ............. 711/103 |
| 2002/0069314 | A1 | 6/2002 | Miyauchi |

(Continued)

FOREIGN PATENT DOCUMENTS
EP 1550952 7/2005
(Continued)

OTHER PUBLICATIONS
English Language Abstract of JP 2006-92169.
(Continued)

*Primary Examiner* — Mardochee Chery
(74) *Attorney, Agent, or Firm* — Greenblum & Bernstein, P.L.C.

(57) ABSTRACT

A nonvolatile memory device (101) includes a plurality of physical blocks, each of which is provide with a nonvolatile memory (103), a logic/physical address conversion table, a temporary block and a temporary table. The nonvolatile memory (103) includes a plurality of pages which are predetermined writing units, respectively. The logical-physical address conversion table (106) stores correspondence information between logic addresses and physical addresses of data to be stored in the physical blocks. The temporary block is a physical block to store data that are smaller in size than those of the page. The temporary table (107) stores correspondence information between logic addresses and physical addresses with respect to data to be stored in the temporary block.

25 Claims, 25 Drawing Sheets

U.S. PATENT DOCUMENTS

| | | |
|---|---|---|
| 2003/0189860 A1* | 10/2003 | Takeuchi et al. ............... 365/200 |
| 2003/0200402 A1* | 10/2003 | Willman et al. ............... 711/154 |
| 2005/0030791 A1 | 2/2005 | Liang et al. |
| 2005/0055531 A1* | 3/2005 | Asami et al. ................... 711/203 |
| 2005/0141312 A1 | 6/2005 | Sinclair et al. |
| 2005/0141313 A1 | 6/2005 | Gorobets et al. |
| 2005/0144360 A1 | 6/2005 | Bennett et al. |
| 2005/0144365 A1 | 6/2005 | Gorobets et al. |
| 2005/0144368 A1 | 6/2005 | Chung et al. |
| 2005/0166087 A1 | 7/2005 | Gorobets |
| 2005/0169058 A1 | 8/2005 | Myoung et al. |
| 2006/0020745 A1 | 1/2006 | Conley et al. |
| 2006/0064538 A1 | 3/2006 | Aizawa |
| 2006/0155920 A1* | 7/2006 | Smith et al. ................... 711/103 |
| 2006/0155922 A1* | 7/2006 | Gorobets et al. ............... 711/103 |
| 2007/0276986 A1 | 11/2007 | Honda |

FOREIGN PATENT DOCUMENTS

| | | |
|---|---|---|
| EP | 1562121 | 8/2005 |
| EP | 1659497 | 5/2006 |
| JP | 5 216780 | 8/1993 |
| JP | 9 18551 | 7/1997 |
| JP | 11 53248 | 2/1999 |
| JP | 2001 154909 | 6/2001 |
| JP | 2002 324008 | 11/2002 |
| JP | 2003 508861 | 3/2003 |
| JP | 2005 196736 | 7/2005 |
| JP | 2005 222534 | 8/2005 |
| JP | 2006 92169 | 4/2006 |
| WO | 99 08177 | 2/1999 |
| WO | 01 18640 | 3/2001 |
| WO | 2005/022393 | 3/2005 |
| WO | 2006/065655 | 6/2006 |

OTHER PUBLICATIONS

English Language Abstract of JP 2005-222534.
English Language Abstract of JP 2005-196736.
English Language Abstract of JP 9-185551.
English Language Abstract of JP 2003-508861.
English Language Abstract of JP 2001-154909.
English Language Abstract of JP 11-53248.
English Language Abstract of JP 2002-324008.
English Language Abstract of JP 5-216780.
U.S. Appl. No. 11/909,311 to Honda., filed Sep. 21, 2007.

* cited by examiner

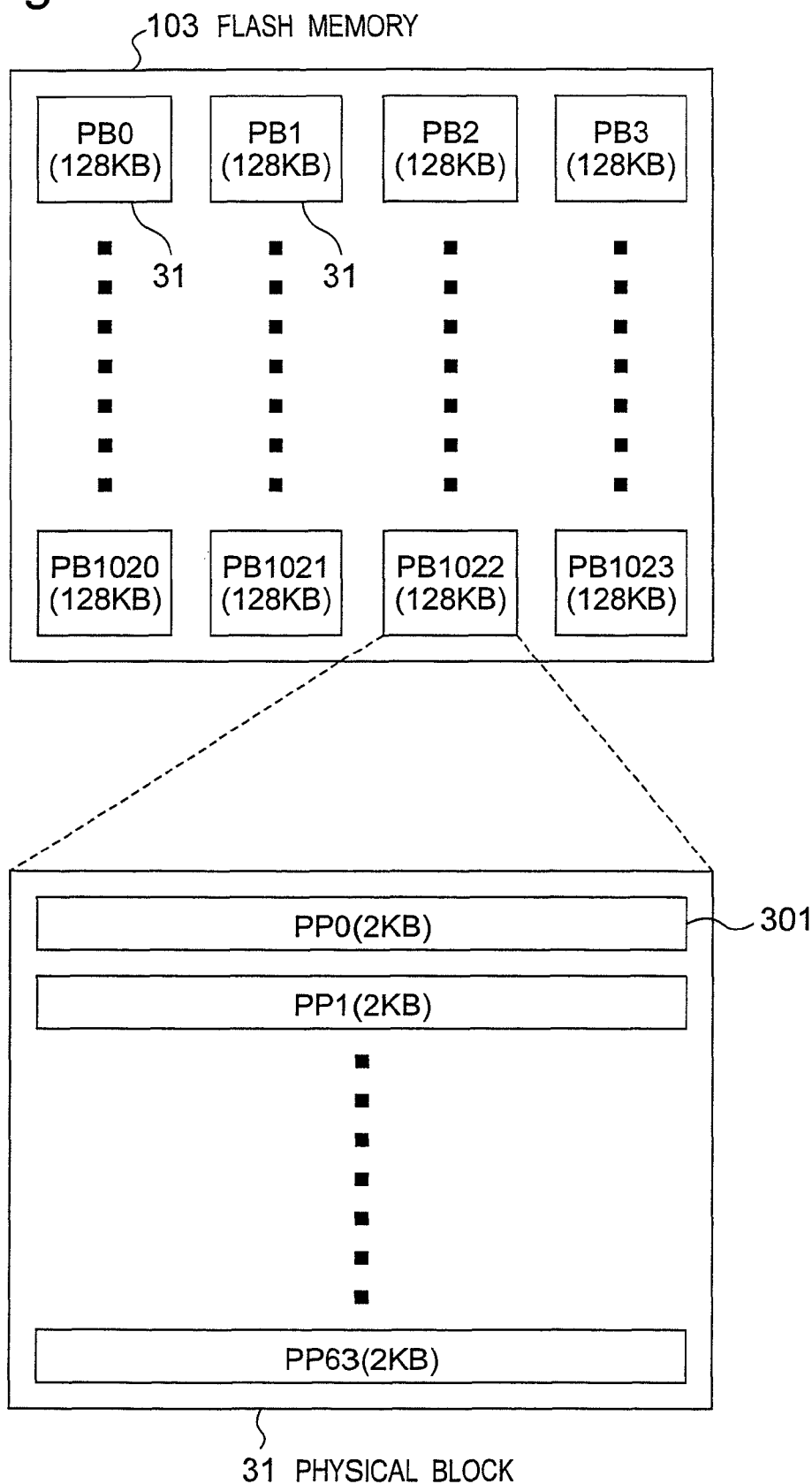

Fig.6

107 TEMPORARY TABLE

| PHYSICAL ADDRESS OF TEMPORARY BLOCK |
|---|
| PHYSICAL PAGE FOR NEXT WRITING |
| PHYSICAL PAGE ADDRESS OF VALID DATA 0 |
| PHYSICAL PAGE ADDRESS OF VALID DATA 1 |
| PHYSICAL PAGE ADDRESS OF VALID DATA 2 |
| PHYSICAL PAGE ADDRESS OF VALID DATA 3 |
| LOGICAL PAGE ADDRESS OF DATA AT PHYSICAL PAGE OF VALID DATA 0 |
| LOGICAL PAGE ADDRESS OF DATA AT PHYSICAL PAGE OF VALID DATA 1 |
| LOGICAL PAGE ADDRESS OF DATA AT PHYSICAL PAGE OF VALID DATA 2 |
| LOGICAL PAGE ADDRESS OF DATA AT PHYSICAL PAGE OF VALID DATA 3 |

*Fig.18E*

WRITE SECTOR 15

TEMPORARY BLOCK

| | | | | | | | | |
|---|---|---|---|---|---|---|---|---|
| 0 | 4 | 5 | 6 | 7 | 0 | - | - | - |
| 1 | 4 | 5 | 6 | 7 | 1 | - | - | - |
| 2 | 4 | 5 | 6 | 7 | 2 | - | - | - |
| 3 | 12 | 13 | 14 | 15 | 3 | - | - | - |
| 4 | 12 | 13 | 14 | 15 | 4 | - | - | - |
| ⋮ | | | | | | | | |
| 63 | UNUSED | | | | UNUSED | | | |

NORMAL BLOCK

| | | | | |
|---|---|---|---|---|
| 0 | 0 | 1 | 2 | 3 |
| 1 | 4 | 5 | 6 | 7 |
| 2 | 8 | 9 | 10 | 11 |
| 3 | UNUSED | | | |
| ⋮ | | | | |
| 63 | UNUSED | | | |

*Fig.18F*

WRITE SECTOR 15

TEMPORARY BLOCK

| | | | | | | | | |
|---|---|---|---|---|---|---|---|---|
| 0 | 4 | 5 | 6 | 7 | 0 | - | - | - |
| 1 | 4 | 5 | 6 | 7 | 1 | - | - | - |
| 2 | 4 | 5 | 6 | 7 | 2 | - | - | - |
| 3 | 12 | 13 | 14 | 15 | 3 | - | - | - |
| 4 | 12 | 13 | 14 | 15 | | - | - | - |
| 5 | 12 | 13 | 14 | 15 | 5 | - | - | - |
| ⋮ | | | | | | | | |
| 63 | UNUSED | | | | UNUSED | | | |

NORMAL BLOCK

| | | | | |
|---|---|---|---|---|
| 0 | 0 | 1 | 2 | 3 |
| 1 | 4 | 5 | 6 | 7 |
| 2 | 8 | 9 | 10 | 11 |
| 3 | UNUSED | | | |
| ⋮ | | | | |
| 63 | UNUSED | | | |

*Fig.19A* WRITE SECTORS 0~6

*Fig.19B* WRITE SECTOR 7

*Fig.19C* WRITE SECTOR 7

*Fig.19D* WRITE SECTORS 8~14

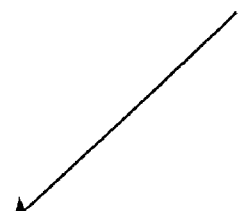

Fig.23E
WRITE SECTORS 8~14

INVOLVING MEDIUM PART IN SEQUENTIAL WRITING

Fig.23F
WRITE SECTOR 15

Fig.23G
WRITE SECTOR 15

Fig.24H

WRITE DIRECTORY ENTRY

TEMPORARY BLOCK

| | | | | | | | | |
|---|---|---|---|---|---|---|---|---|
| 0 | 4 | 5 | 6 | 7 | 0 | - | - | - |
| 1 | 4 | 5 | 6 | 7 | 1 | - | - | - |
| 2 | 4 | 5 | 6 | 7 | 2 | - | - | - |
| 3 | DE | - | - | - | 2 | 3 | - | - |
| 4 | 12 | 13 | 14 | 15 | 4 | 3 | - | - |
| 5 | 12 | 13 | 14 | 15 | 4 | 3 | - | - |
| 6 | 12 | 13 | 14 | 15 | 6 | 3 | - | - |
| 7 | DE | - | - | - | 6 | 7 | - | - |
| ⋮ | | | | | | | | |
| 63 | UNUSED | | | | UNUSED | | | |

NORMAL BLOCK

| | | | | |
|---|---|---|---|---|
| 0 | 0 | 1 | 2 | 3 |
| 1 | 4 | 5 | 6 | 7 |
| 2 | 8 | 9 | 10 | 11 |
| 3 | UNUSED | | | |
| 4 | UNUSED | | | |
| ⋮ | | | | |
| 63 | UNUSED | | | |

NONVOLATILE MEMORY DEVICE INCLUDING A LOGICAL-TO-PHYSICAL LOGIG-TO-PHYSICAL ADDRESS CONVERSION TABLE, A TEMPORARY BLOCK AND A TEMPORARY TABLE

TECHNICAL FIELD

The present invention relates to a storage device using a nonvolatile memory such as a flash memory and a writing method and a reading method thereof.

BACKGROUND ART

In recent years, a memory card having a nonvolatile memory mounted thereon has been expanding its market as a recording medium of a digital camera and a cellular phone. With an increase in capacity of memory card, its use has been spreading from small capacity recording such as a data file and a still image to moving image recording that requires a large capacity. Therefore, conventionally, various designs have been tried on the recording medium having the nonvolatile memory mounted thereon (for example, patent documents 1 to 4).

The memory card of large capacity can save a large amount of data and can store various kinds of data, and therefore management information thereof is diversified. For example, the management information includes a metadata management file for accelerating file access, a file of a virtual directory structure in which the information is managed by types of data, and a database type file system different from the conventional FAT file system. An object of such management information is to facilitate management. Such diversified management information has small size, and thus it causes a factor of increasing a frequency of data writing for each sector as a result.

Patent document 1: JP-A-2001-154909
Patent document 2: JP-A-11-53248
Patent document 3: JP-A-2002-324008
Patent document 4: JP-A-05-216780

DISCLOSURE OF THE INVENTION

Problem to be Solved by the Invention

With growth of capacity of the flash memory, the size of an erase block as an erase unit becomes large. As a result, when writing of random data of small size such as the aforementioned diversified management information is increased, copying of data in a physical block unit occurs frequently in the flash memory, thus deteriorating writing performance.

In addition, there is a multivalued memory cells as a method of realizing a large-capacity flash memory. Control of multivalued memory cells is complicated and difficult to secure reliability compared to binary memory cells, and therefore in order to secure the same level of reliability as the binary memory cells, reduction of stress to the memory cells is required. Therefore, in the multivalued memory cells, a page composed of a plurality of sectors is selected as a writing unit, and a plurality of times of writing are not allowed to this page. Namely, in the case of the multivalued memory cells, even when the data of the size smaller than a page size is written, writing on a page basis is required, and this is a factor of inviting deterioration of writing performance.

The present invention has been made in order to solve the above-described problem, and an object of the present invention is to provide a semiconductor storage device capable of writing data of size smaller than a predetermined writing unit is written therein at a high speed in a plurality of areas in the flash memory in which data should be written in a predetermined writing unit (for example page unit).

Means for Solving the Problem

In a first aspect of the invention, a nonvolatile memory device is provided, to which data can be written based on a logical address.

The nonvolatile memory device includes: a nonvolatile memory in which data is written based on a physical address corresponding to the logical address, and which includes a plurality of physical blocks, each physical block including a plurality of pages, each page being a predetermined writing unit; a logical-physical address conversion table for storing correspondence information between a logical address and a physical address of data stored in the physical block; a temporary block which is a physical block storing data having a smaller size than a size of the page; and a temporary table for storing correspondence information between a logical address and a physical address regarding the data stored in the temporary block.

In a second aspect of the invention, a memory controller is provided, which is for controlling an action of a nonvolatile memory device including a nonvolatile memory in which data can be written based on a logical address.

The nonvolatile memory is written data based on a physical address corresponding to the logical address, and includes a plurality of physical blocks. Each physical block includes a plurality of pages. Each page is a predetermined writing unit. The memory controller includes: a logical-physical address conversion table for storing correspondence information between a logical address and a physical address of the data stored in the physical block; a temporary block which is a physical block storing data having a smaller size than a size of the page; and a temporary table for storing correspondence information between a logical address and a physical address regarding the data stored in the temporary block. When the size of the data requested to be written is smaller than the size of the page, the data requested to be written is written in the temporary block.

In a third aspect of the invention, a data writing method is provided for a nonvolatile memory device in which data can be written based on a logical address.

The nonvolatile memory device includes: a nonvolatile memory in which data is written based on a physical address corresponding to the logical address, and which includes a plurality of physical blocks, each physical block including a plurality of pages, each page being a predetermined writing unit; a logical-physical address conversion table for storing correspondence information between a logical address and a physical address of data stored in the physical block; and a temporary block which is a physical block storing data having a smaller size than a size of the page.

The writing method includes: receiving a request for writing data from outside; and determining if the data requested to be written is to be written in the temporary block, based on the address of the data to be written.

In a fourth aspect of the invention, a data reading method is provided for a nonvolatile memory device from which data can be read based on a logical address.

The nonvolatile memory device includes: a nonvolatile memory from which data is read based on a physical address corresponding to the logical address, and which includes a plurality of physical blocks, each block including a plurality of pages, each page being a predetermined writing unit; a logical-physical address conversion table for storing correspondence information between a logical address and a physical address of the data stored in the physical block; a temporary block which is a physical block storing data having a smaller size than a size of the page; and a temporary table for storing correspondence information between a logical address and a physical address regarding the data stored in the temporary block.

The reading method includes: referring to the temporary table when receiving a request for reading data; and reading the data from the temporary block, when a reading address has been registered in the temporary table, or reading the data with reference to the logical-physical address conversion table, when the reading address has not been registered in the temporary table.

In a fifth aspect of the invention, provided is a generating method of a management table in a nonvolatile memory device to/from which data can be written/read based on a logical address.

The nonvolatile memory device includes: a nonvolatile memory to/from which the data is written/read based on a physical address corresponding to the logical address, and which includes a plurality of physical blocks, each physical block including a plurality of pages, each page being a predetermined writing unit; a logical-physical address conversion table for storing correspondence information between a logical address and a physical address of the data stored in the physical block; a temporary block which is a physical block for storing data having a smaller size than the size of the page; and a temporary table which is a management table for storing correspondence information between a logical address and a physical address regarding the data stored in the temporary block.

The generating method includes: determining a page in the temporary block, to which data has been finally written; and generating the temporary table based on the information of the determined page.

Effect of the Invention

According to the present invention, in the nonvolatile memory having a predetermined erase unit such as a flash memory and having the flash memory in which data writing must be done in a predetermined writing unit (such as a page unit), the data is written in a recording area (physical block) different from the recording area used in a normal writing operation, in a case of writing the data of a smaller size than a predetermined writing unit (such as a page unit). Thus, it is possible to reduce a copy count of the data between recording areas in writing of the data, and as a result, writing process can be accelerated.

BRIEF DESCRIPTION OF DRAWINGS

FIG. 2 is a view showing a structure of the inside of a flash memory and a structure of a physical block.

FIG. 6 is a view showing the data format of a temporary table 107.

FIGS. 18E and 18F are views showing the transition of the state in the temporary block during the writing of data, in the first access example (continuation of FIG. 17D).

FIGS. 19A to 19D are views showing a transition of a state in a temporary block during writing of data by a conventional method.

FIGS. 20E and 20F are views showing the transition of the state in the temporary block during the writing of data by the conventional method (continuation of FIG. 19D).

FIGS. 23E to 23G are views showing the transition of the state in the temporary block during the writing of data in the second access example (continuation of FIG. 22D).

FIG. 24H is a view showing the transition of the state in the temporary block for writing data in the second access example (continuation of FIG. 23G).

BEST MODE FOR CARRYING OUT THE INVENTION

Preferred embodiments of the present invention will be described with reference to the accompanying drawings.

1. Structure of Memory Card

Figure 1:
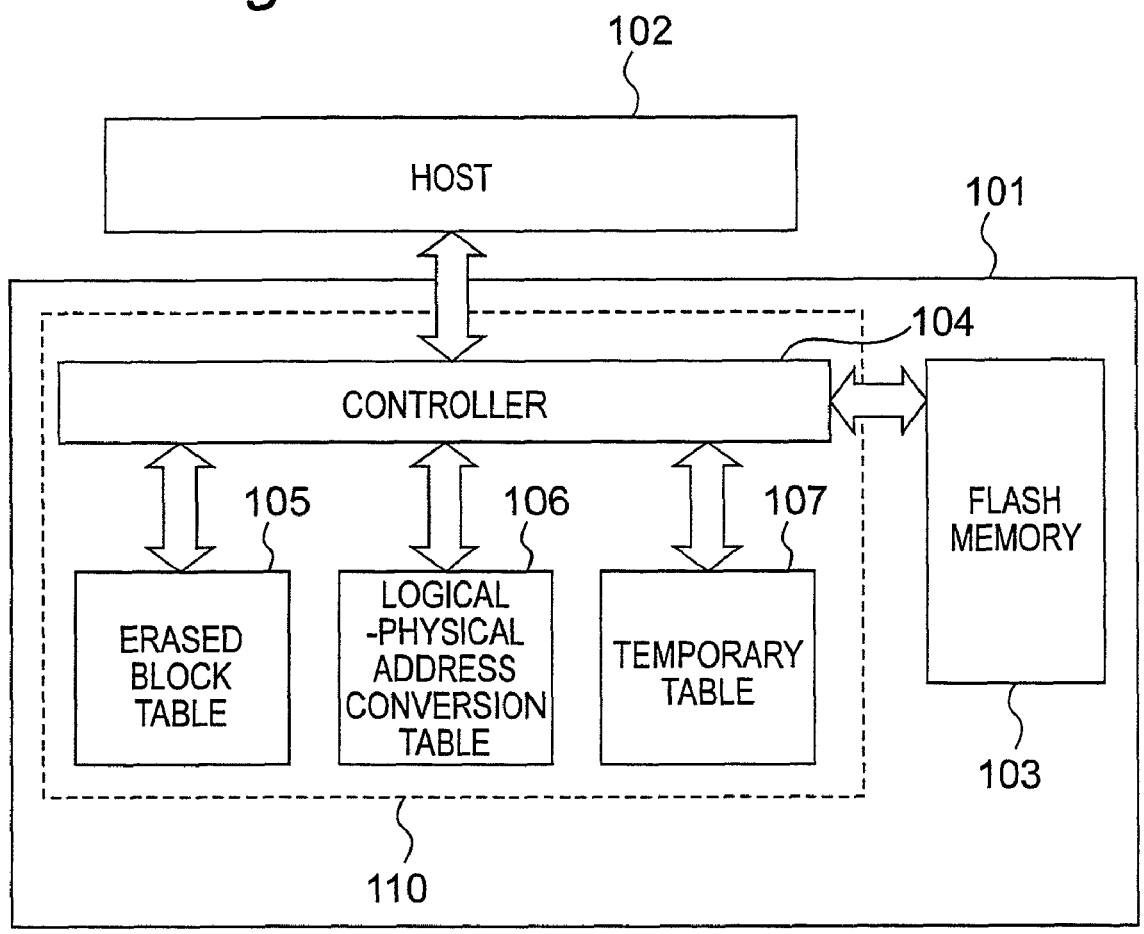
FIG. 1 is a view showing a structure of a memory card as an embodiment of a nonvolatile memory device according to the present invention.

FIG. 1 shows a structure of a memory card as an embodiment of a nonvolatile memory device according to the present invention. A memory card 101 is a storage device capable of reading and writing data from and to a host 102 which is external equipment. The memory card 101 includes a flash memory 103 which is a nonvolatile storage element, and a memory controller 110 for controlling writing/reading of data to/from the flash memory 103. The memory controller 110 includes a controller 104, an erased block table 105, a logical-physical address conversion table 106, and a temporary table 107. The memory controller 110 and the flash memory 103 can be realized by a semiconductor integrated circuit.

The flash memory 103 has a capacity of 128 MB. However, the capacity of the flash memory 103 is not limited thereto. In addition, a plurality of flash memories may be provided. The controller 104 controls storage of data in the flash memory 103 or reading of data from the flash memory 103 in response to a reading/writing instruction from the host 102. In this embodiment, the flash memory 103 is a multi-valued memory cell capable of storing ternary or more multi-valued information in one cell. However, the flash memory 103 may be a binary (two-valued) memory cell.

The data stored in the flash memory 103 is managed by FAT file system which is one of the file systems. The FAT file system includes a master boot record, partition table, a partition boot sector, a FAT table 1 and a FAT table 2, and a root directory entry, as file management information (hereinafter referred to as "FAT information").

The master boot record, partition table stores the information for managing a data recording area which is divided into a plurality of areas called partitions. The partition boot sector stores management information in one of the partitions. The FAT table 1 and the FAT table 2 respectively indicate a storage position of the data included in a file. The root directory entry stores the information of the file and directory just below a root directory. It should be noted that the file system may be a system of another kind.

FIG. 2 is a view showing a structure of the inside of the flash memory 103. The recording area of the flash memory 103 is constituted of a plurality of physical blocks 31. A physical block 31 has a capacity of 128 kB, serving as an erase unit in which all data is erased at one.

In addition, a physical block 31 includes a plurality of physical pages 301. In this embodiment, one physical block 31 includes sixty-four pages. A physical page 301 is a writing unit for data writing and has a capacity of 2 kB. One physical page includes four sectors. In the physical pages 301, when data is written once, data cannot be overwritten. A cluster has a capacity of 16 kB, which is a unit based on which the host 102 logically writes data. This value is not coincident with the capacity of 128 kB of the physical block 31 and the capacity of 2 kB of the physical page 301. Therefore, a partial physical block with the capacity of 16 kB is constituted by the physical pages 301 of continuing eight pages. The partial physical block (16 kB) is a unit of data logically processed by the controller 103 on the assumption that the data is written from the host 102. One physical block 31 includes eight partial physical blocks, and data is written thereinto from the host 102 by the partial physical block unit.

Figure 3A:
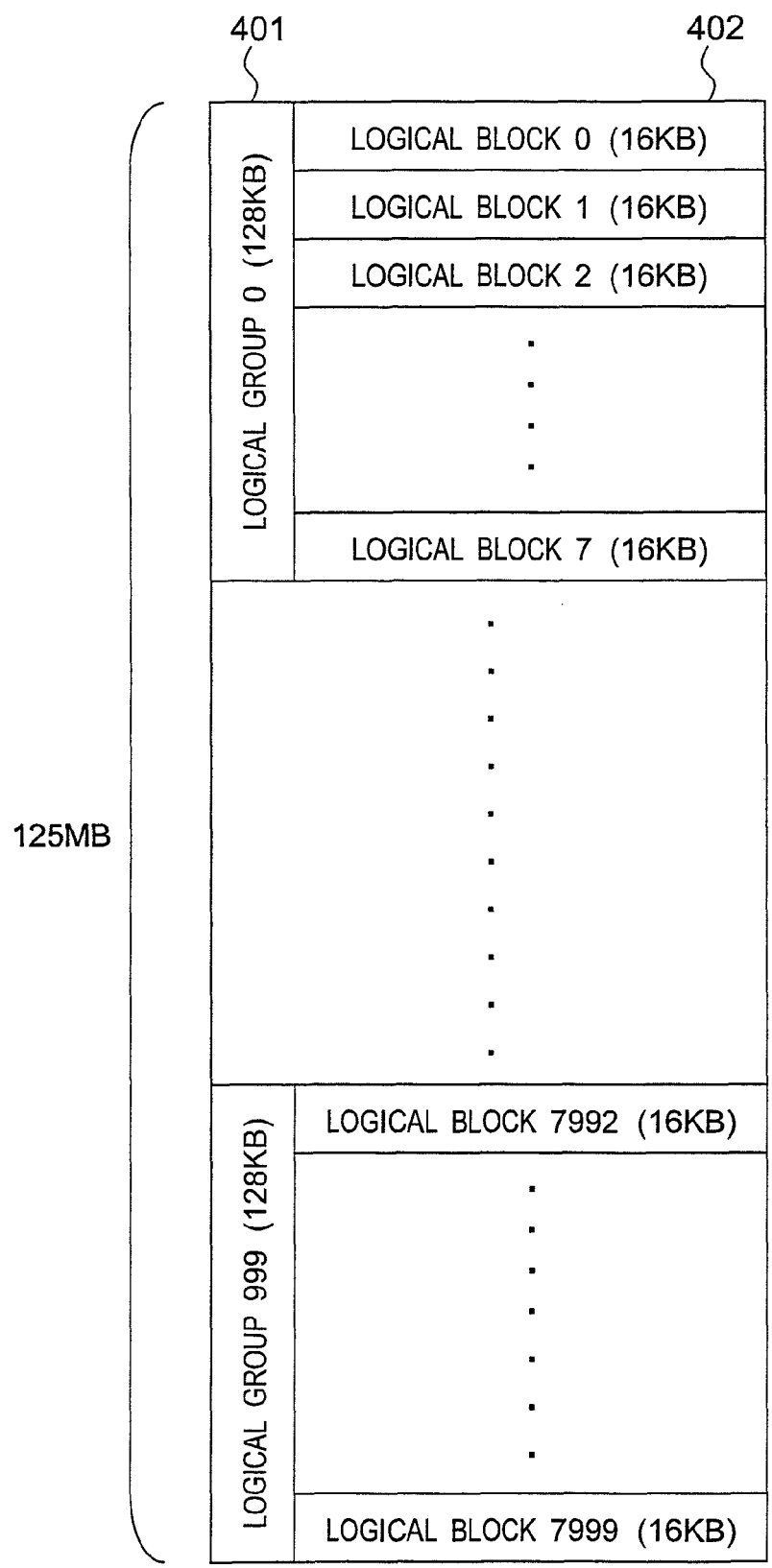
FIG. 3A is a view showing management of logical data in the memory card.

FIG. 3A is a view showing a logical management of data in the memory card 101. Storage capacity of the flash memory 103 mounted on the memory card 101 is 128 MB. Generally, in the flash memory 103, initial bad blocks or bad block caused by repeated rewriting could sometimes occur. Accordingly, the capacity of the memory card 101 is set to be slightly smaller than the real capacity. In this example, a substantial capacity that can be recognized by the host 102 is 125 MB. 16 kB unit which is a unit of data writing from the host 102 is defined as "a logical block" 402, and 0 to 7999 are sequentially allotted thereto in the capacity of 125 MB of the memory card 101. Eight logical blocks compose a "logical group" 401 of 128 kB unit equal to the physical block 31 which is the erase unit of the flash memory 103.

In FIG. 1, the erased block table 105 stores information indicating whether the data has been already erased or written in the physical blocks in the flash memory 103. The logical-physical address conversion table 106 is a table for conversion between an address specified by the host 102 ("logical address") and an address in the flash memory 103 ("physical address").

Figure 3B:
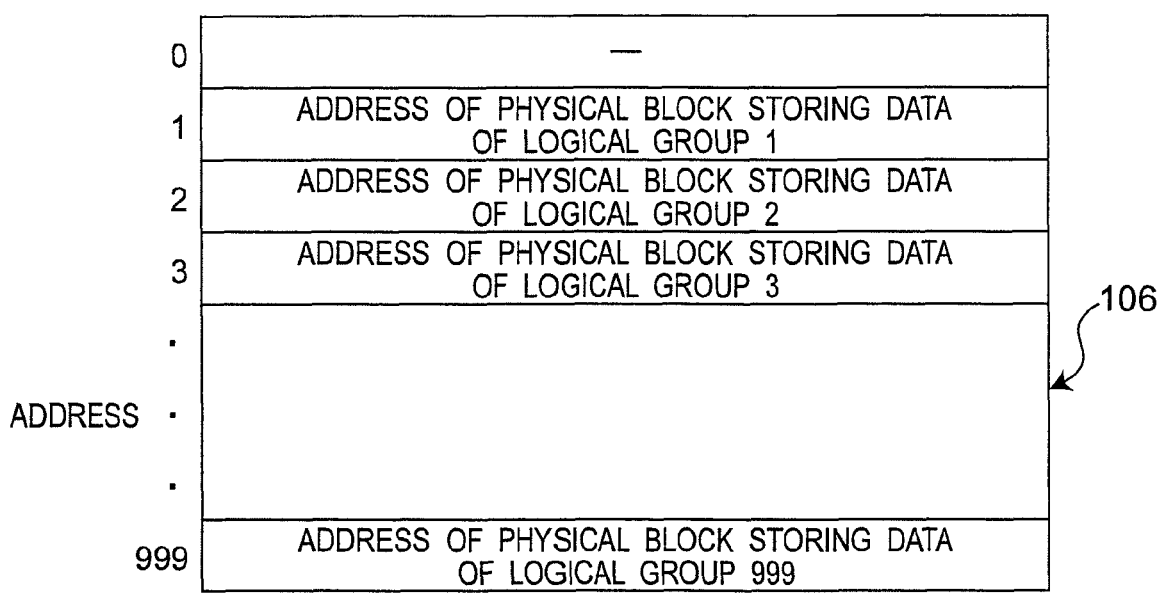
FIG. 3B is a view showing a constitutional example of a logical-physical address conversion table.

The logical-physical address conversion table 106 stores an address of a physical block 31 corresponding to a logical group 401, in the recording area of the address corresponding to the logical group address. A simplified structure of the logical-physical address conversion table 106 is shown in FIG. 3B. The logical-physical address conversion table 106 has a logical group address as the address of the table and a physical address corresponding to a logical address as the data of the table. When no corresponding physical block 31 exists, the logical-physical address conversion table 106 has an invalid value (such as "0x0000") as the data.

In this embodiment, when data which is requested to be written by the host 102 and of which size is smaller than a page size is written to the flash memory 103, the data is written in a specific physical block 31. In this embodiment, this specific physical block 31 is referred to as a "temporary block". The temporary block 107 is a table for storing various kinds of information on the data written in the temporary block, such as correspondence information between the physical address and the logical address of the data written in the temporary block.

A physical block 31 which is not the temporary block and is subjected to a general writing operation in the flash memory 103 independent of the data size is called a "normal block". When data is written in the normal block, the correspondence between the physical address and the logical address is managed by the logical-physical address conversion table 106.

In the memory card 101 according to this embodiment, the data of a small unit, to which a request for writing is made from the host 102 and whose size is smaller than a page size, is stored in a page of the temporary block.

It should be noted that in this embodiment, one physical block is treated as a management unit of the data. However, a plurality of physical blocks 31 may be treated as a larger management unit (hereinafter referred to as a "physical super block"). In this case, a set of the logical blocks corresponding to a physical super block is managed as a logical super block, and the logical-physical address conversion table 106 stores the correspondence information between the physical super block and the logical super block.

1-1. Format of Temporary Page

Figure 4:
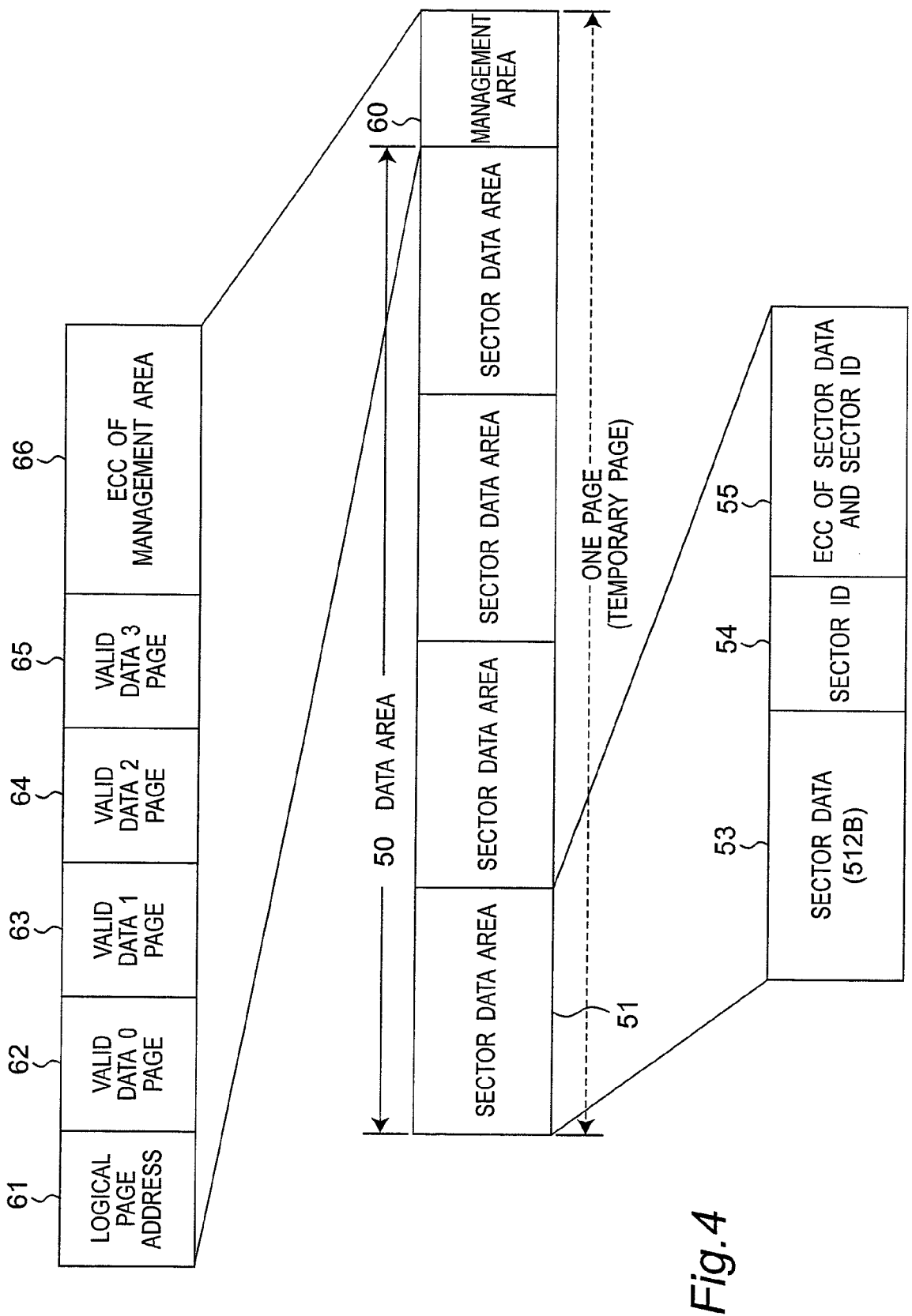
FIG. 4 is a view showing a data format of a temporary page of the flash memory.

FIG. 4 shows a data format of one page (hereinafter referred to as a "temporary page") in the temporary block of the flash memory 103. The temporary page has a data area 50 for storing the data of one page (hereinafter referred to as "page data"), and a management area 60 for storing management information regarding this page data. The data area 50 includes four sector data areas 51. Each sector data area 51 stores sector data 53, sector ID 54, and ECC 55 regarding the sector data 53 and the sector ID 54.

The management area 60 has a field 61 of a logical page address, a field 62 of a valid data 0 page, a field 63 of valid data 1 page, a field 64 of valid data 2 page, a field 65 of valid data 3 page, and a field 66 of ECC (Error Correction Code) of the management area 60. The field 61 of the logical page address stores the logical address of this page. In this embodiment, the maximum number of the temporary pages that can be simultaneously registered in the temporary block 80 as valid data is four. However, the maximum number is not limited to four, and may be any number as long as it is smaller than the maximum number of pages (64 in this example) in one physical block 31. The valid data is data to be read. Invalid data is not data to be read even thought it is stored in the temporary block 80. The field 62 of the valid data 0 page, the field 63 of the valid data 1 page, the field 64 of the valid data 2 page, and the field 65 of the valid data 3 page store the physical page addresses of respective page data (valid data 0 to 3) stored as the valid temporary page data, respectively.

Figure 5:
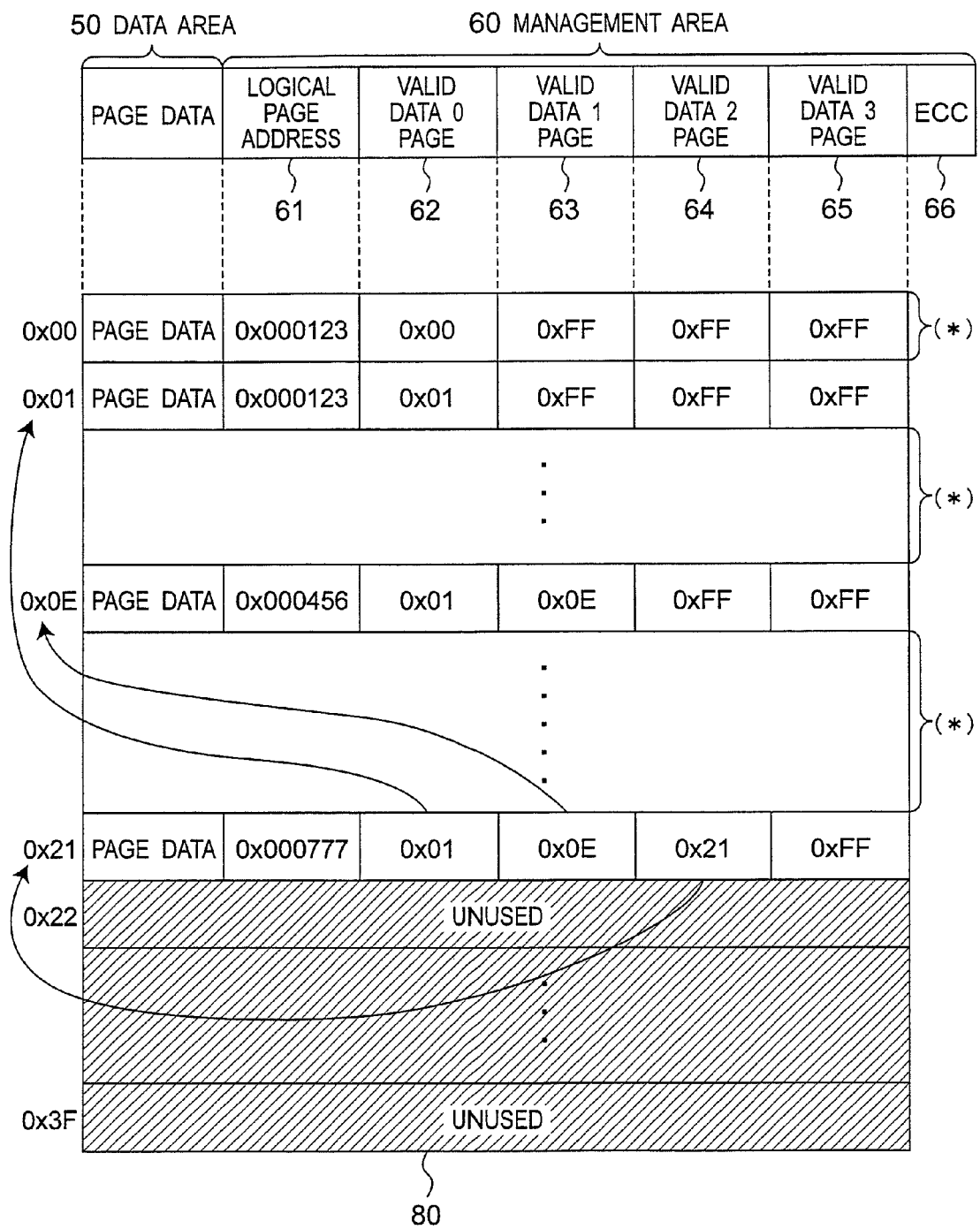
FIG. 5 is a view showing a storage example of the temporary page data in a temporary block.

FIG. 5 shows a storage example of the temporary page data in the temporary block 80. The temporary block 80 has an area (page) of 64 pages from 0x00 to 0x3F. In the example of FIG. 5, the data is written in each area of 0x00 to 0x21. Each page has the management area 60. In this embodiment, the information in the management area 60 in the physical page into which the latest data is written is referenced as valid information. Namely, in the state of FIG. 5, the management information 60 (valid data 0 page, valid data 1 page, valid data 2 page and valid data 3 page) in the physical page 301 at 0x21 is referenced. The field 62 of the valid data 0 page, the field 63 of the valid data 1 page, and the field 64 of the valid data 2 page store "0x01", "0x0E", and "0x21", respectively. This shows that data stored in the pages having the physical page addresses 61 of "0x01", "0x0E", and "0x21" in the temporary block 80 is the valid data as the temporary pages. It should be noted that "0xFF" stored in the field 65 of the valid data 3 page indicates invalidity. Namely, in the example of FIG. 5, only three pages are stored as the valid temporary pages. In FIG. 5, the page shown by (*) is the temporary page that is invalidated.

With reference to FIG. 5, description will be given to a transition of the management information 60 in writing of the temporary page data. The temporary block 80 has an area of sixty-four pages from 0x00 to 0x3F, into which the data from the page with the physical page address of 0x00 is written.

In the example of FIG. 5, the page data is written in the physical page address 0x00 in the temporary block 80. At this time, the logical page address ("0x000123" in FIG. 5) of this page data is written in the field 61 of the logical page address. At this point in time, the data is written only in the area of the physical address 0x00 as the valid temporary page data in the temporary block 80. Accordingly, its page address "0x00" is written in the field 62 of the valid data 0 page. "0xFF" indicating invalidity is written in the fields 63 to 65 of the valid data page other than the field 62 of the valid data 0 page.

Subsequently, the page data is written in the next physical page address "0x01". At this time, its logical page address (0x000123) is the same as that of the page data that has been already written in the physical page address "0x00", and therefore the previously written temporary page data is invalidated.

Invalidating process is performed when overwriting is performed on the logical page in which the valid data exists in the temporary block 80 and writing of data into the temporary block occurs.

The data is invalidated by updating the management area together with the writing of valid sector data, and therefore the valid logical page address is recorded in the field 61 in the invalidating process.

Invalidation is performed as follows. A value of the valid data 0 page recorded in the field 62 is overwritten with "0x01" that is the physical page address in which the page data has been newly written. "0xFF" indicating invalidity is written in the fields 63 to 65 of the other valid data pages. By overwriting the value of the valid data 0 page in this manner, the temporary page which has been valid before can be invalidated. As described above, in this embodiment, the management information 60 of the page into which the latest data has been written is referenced for identifying the valid page.

It should be noted that there is given an example in which the logical page to be overwritten where valid data exists in the temporary block 80 is the same (0x000123) as the logical page where the writing of data into the temporary block occurs. As long as the logical page in which the valid data exists in the temporary block 80 is overwritten and the writing of data into the temporary block occurs, the logical pages may not necessarily be the same.

1-2. Format of Temporary Table

FIG. 6 shows a data format of the temporary table 107. In the temporary table 107, the field of the "physical address of temporary block" stores the physical address of the physical block 31 used as the temporary block 80. The field of the "physical page for next writing" stores the physical address of the temporary page in which the data is to be written next. The field of the "physical page address of valid data 0" stores the physical address of the page in which the valid data is stored as the temporary page in the temporary block 80. This is true for each of the fields of the "physical page address of valid data 1", the "physical page address of valid data 2", and the "physical page address of valid data 3". The field of the "logical page address of data at physical page of valid data 0" stores the logical page address of the data stored in the physical address specified by the "physical page address of valid data 0". This is true for each of the fields of the "logical page address of data at physical page of valid data 1", the "logical page address of data at physical page of valid data 2", and the "logical page address of data at physical page of valid data 3".

For example, in the case of the temporary block as shown in FIG. 5, each field in the temporary table 107 stores values as follows.

TABLE 1

| Field in temporary table | Stored values |
| --- | --- |
| Physical address of temporary block | Physical address of temporary block |
| physical page for Next writing | 0x22 |
| Physical page address of valid data 0 | 0x01 |
| Physical page address of valid data 1 | 0x0E |
| Physical page address of valid data 2 | 0x21 |
| Physical page address of valid data 3 | 0xFF |
| Logical page address of data at physical page of valid data 0 | 0x000123 |
| Logical page address of data at physical page of valid data 1 | 0x000456 |
| Logical page address of data at physical page of valid data 2 | 0x000777 |
| Logical page address of data at physical page of valid data 3 | — |

The temporary table 107 is generated at start of the memory card 101 (when powered on), and thereafter it is updated as needed. The host 102 reads out the value in the temporary table 107 at a predetermined timing such as the starting of the host 102 and stores it on the RAM of the host 102.

2. Operation of Memory Card 2-1. Temporary Table Generation Process

Figure 7:
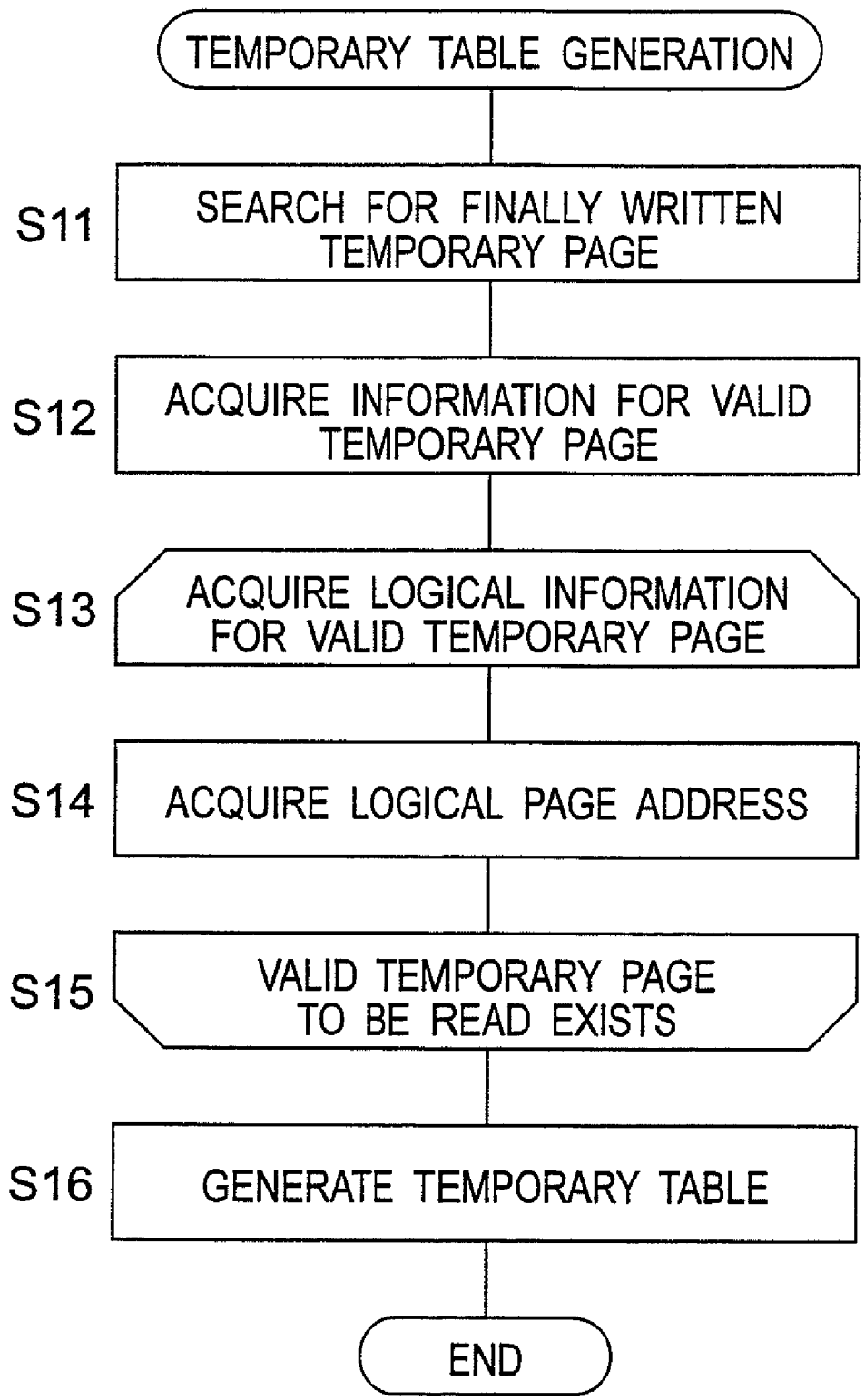
FIG. 7 is a flowchart of temporary table generation process.

The temporary table generation process will be described with reference to the flowchart of FIG. 7.

First, the temporary block 80 is read out and is searched for the temporary page which has been finally written data (S11). In the example of FIG. 5, the page with the physical page address of "0x21" is found as the page in which has been finally written data. Next, the information of the valid temporary page is acquired with reference to the management information 60 of the page which has been finally written data (S12). In the example of FIG. 5, "0x01", "0x0E", "0x21" are obtained as the valid temporary page, from the management information 60 of the page having the physical page address of "0x21". Thereafter, logical page information (logical page address) is acquired for all of the acquired valid temporary pages (S13 to S15). In the example of FIG. 5, "0x000123", "0x000456", and "0x000777" are obtained as the logical page information. Note that in FIG. 7, steps S13 and S15 show that the step of acquiring logical page address (S14) is repeated until the logical page addresses are acquired for all of the valid temporary pages. Finally, the temporary table 107 is generated by using the acquired information (S16).

2-2. Data Writing

Figure 8:
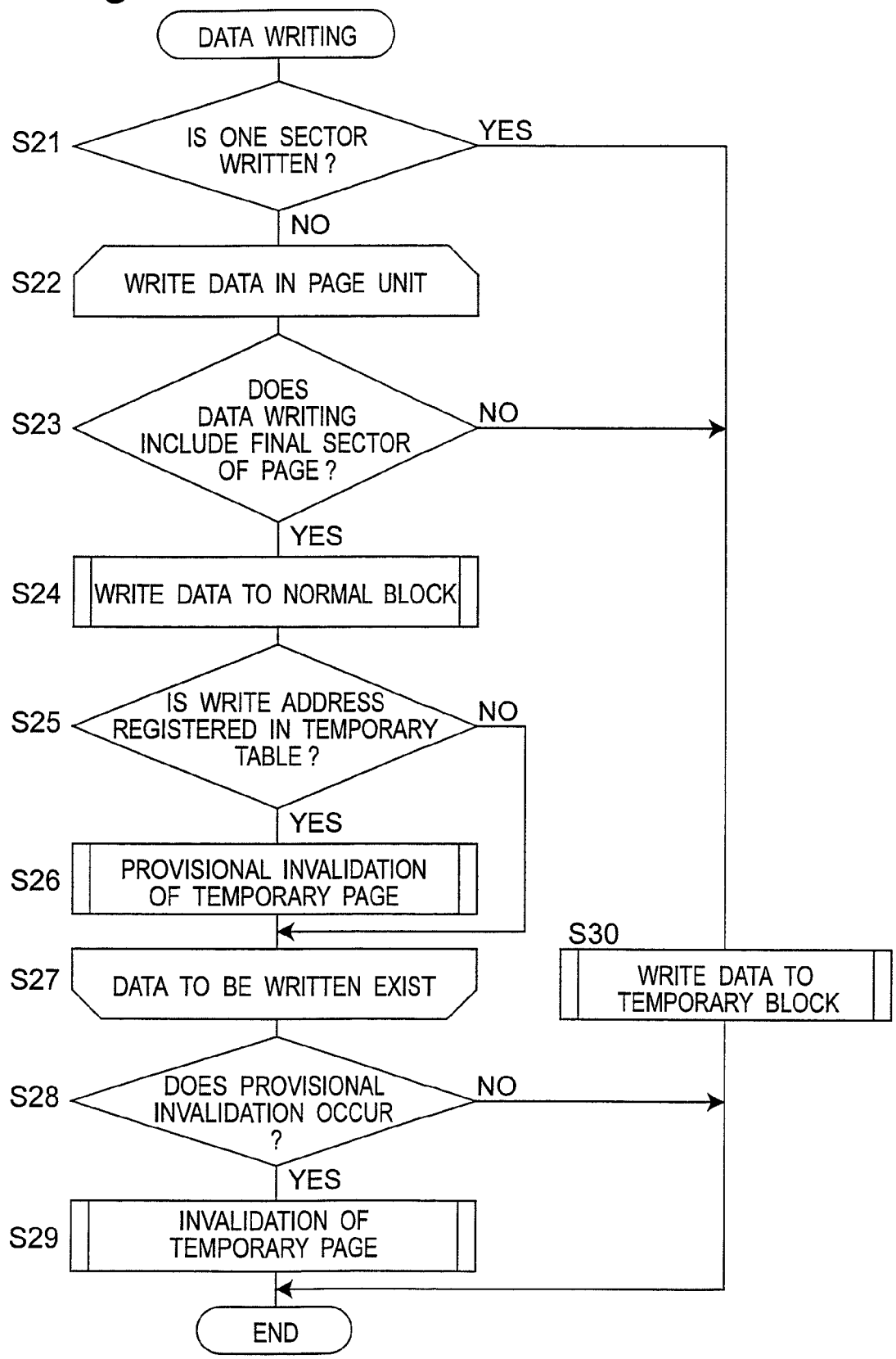
FIG. 8 is a flowchart of data writing process.

Data writing process in the memory card 101 will be described with reference to the flowchart of FIG. 8. The process described below is executed by a controller 104 in the memory card 101.

When a request for writing data (writing command) is received from the host 102, the controller 104 determines whether or not the size of the data to be written is one sector (S21). When it is one sector, the data is written in the temporary block (S30). This process will be described in detail later.

Meanwhile, when it is not one sector, the controller 104 determines whether or not the data to be written includes a final sector in the page (S23). Such a determination is possible based on the address of the data to be written. When the data to be written does not include the final sector in the page, it means that the data to be written has the size of two sectors or three sectors and it is the final data for the request for writing. Meanwhile, when the data to be written includes the final sector in the page, it means that there still exists data to be written that continues thereafter.

Therefore, when the data to be written does not include the final sector in the page, the data is written in the temporary block 80 (S30). When the data to be written includes the final sector in the page, the data is written in a normal block (S24).

At this time, the controller 104 determines whether or not the address of the data to be written has been already registered as the valid temporary page in the temporary table 107 (S25). When such a registration exists, provisional invalidation process is done on this temporary page (S26). As the provisional invalidation process, for example, a flag is set for indicating necessity of doing invalidation for the temporary page. The aforementioned process is repeated for all the data which is requested by the host 102 to be written (S22 and S27).

Figure 9:
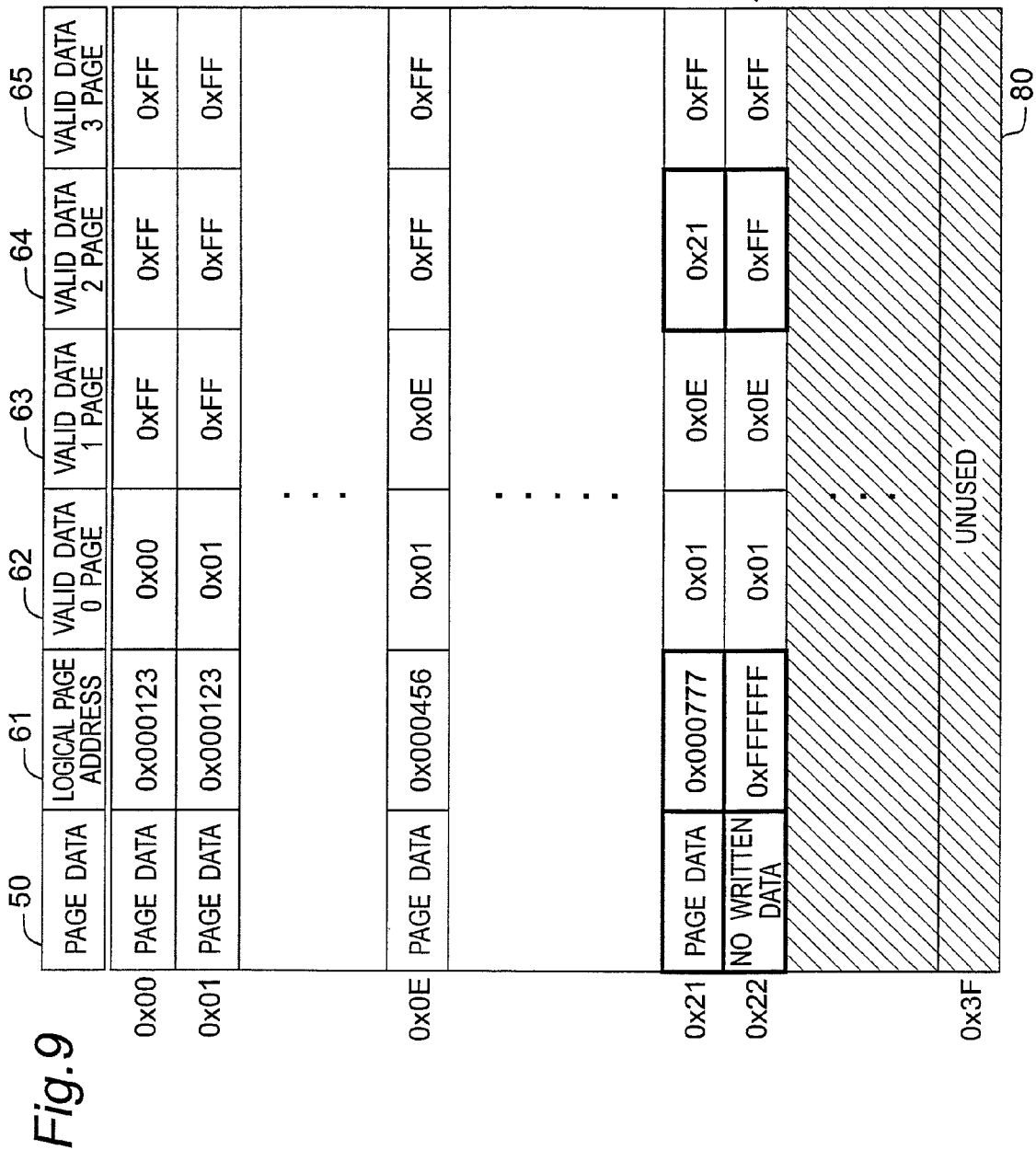
FIG. 9 is a view for explaining data invalidation process.

Thereafter, the controller 104 determines whether or not the provisional invalidation process occurs (for example, confirms the flag). When the provisional invalidation process occurs, invalidation is applied on the temporary page in which the provisional invalidation process in the temporary block 80 occurs (S29). The invalidation (S29) when the provisional invalidation process (S26) occurs is done, when the logical page in which the valid data exists in the temporary block is overwritten and the writing of data into the temporary block does not occur. The invalidation of the temporary page in the temporary block 80 is performed by setting the fields 62, 63, 64 or 65 of the valid data page to be invalidated to "0xFF", and by newly adding the data (hereinafter referred to as "invalidated page data") in which the field 61 of the logical page address is set to "0xFFFFFF", to the physical page for next writing. Nothing is written in the data area 50 in the invalidated page data. For example, FIG. 9 shows the example of invalidating the data with the physical page address of "0x21". In order to invalidate the data at the physical page address "0x21", at the physical page address "0x22", the invalidated page data is written in which the valid data 2 page is set to "0xFF" and the field 61 of the logical page address is set to "0xFFFFFF".

Regarding the flowchart of FIG. 8, determination of writing to the temporary block will be summarized as follows. First, writing of the data with the size of one sector is always written in the temporary block. This is caused by the following reason. When the host 102 updates data that is smaller in size than the writing unit of the memory card 101, the host 102 performs the writing of data on the basis of the writing unit which is a minimum size for writing data to the memory card 101. Therefore, when the host 102 writes data to a continuous logical bite address, the host 102 should do writing of the data with the size of one sector to the same logical sector address a plurality of times. When the data size is not one sector, determination is made whether or not the writing to the temporary block should be done, based on a final address. When the final address does not indicate a final sector in the page, the data is written in the temporary block, irrespective of a head address.

2-3. Data Reading

Figure 10:
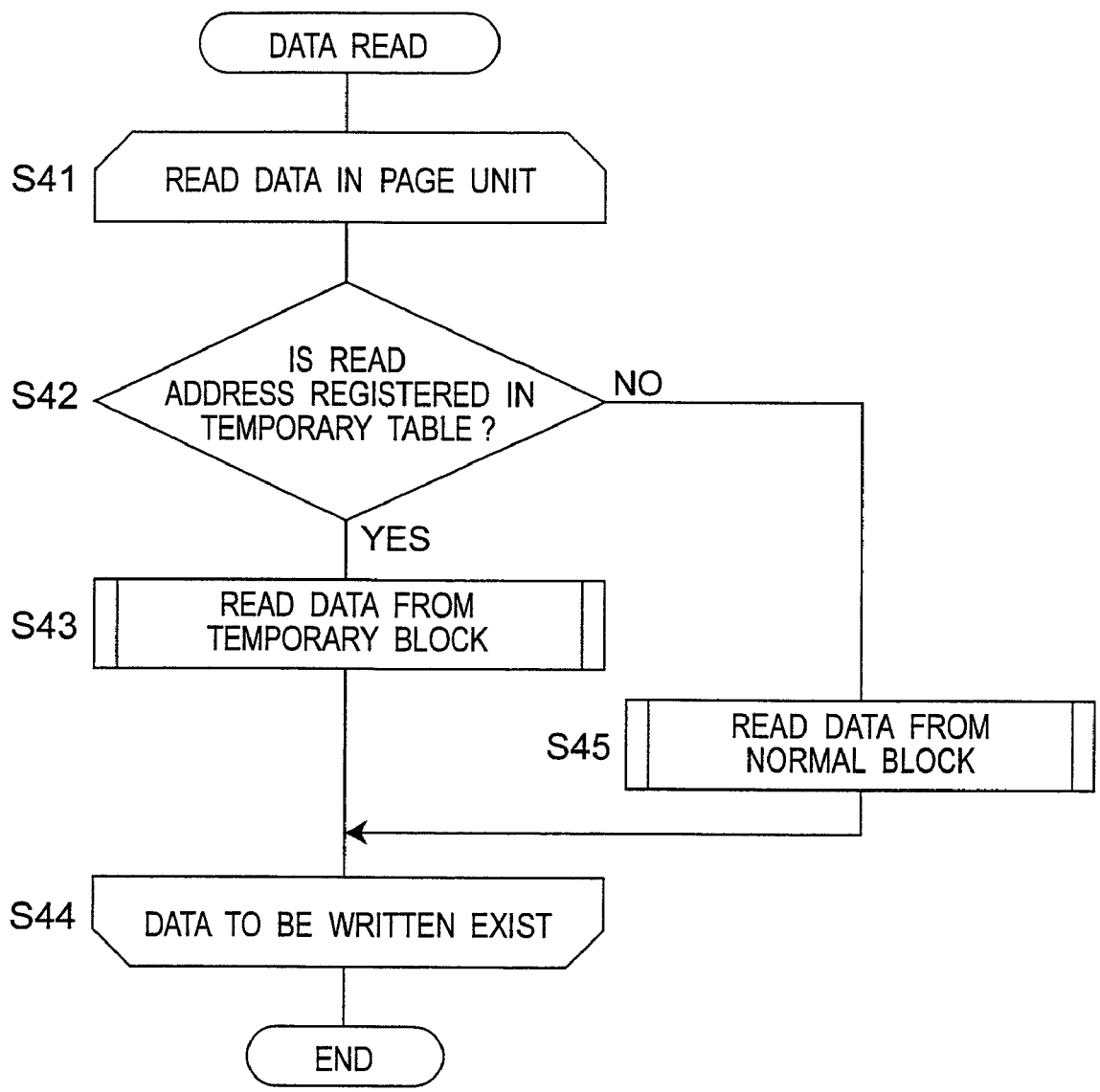
FIG. 10 is a flowchart of data reading process.

Data reading process from the memory card 101 will be described with reference to the flowchart of FIG. 10. The process described below is executed by the controller 104 in the memory card 101.

When a request for reading data is received from the host 102, the controller 104 refers to the temporary table 107. Then, based on the logical address specified by the host 102, the controller 104 determines whether or not the data to be read has been registered in the temporary table 107 (S42). Namely, the controller 104 determines whether or not the data to be read is stored in the temporary block 80.

When the data has been registered in the temporary table 107, the controller 104 reads the data out from the temporary block 80 (S43). More specifically, the controller 104 refers to the temporary table 107, and obtains the physical page address corresponding to the logical address specified by the host 102. Thereafter, the controller 104 reads the data of the physical page address thus obtained from the temporary block 80.

When the data has not been registered in the temporary table 107, the data is read from the normal block based on the reading address specified by the host 102 (S45).

The above-described process is repeated until all the data in the range specified by the host 102 is read out (S41 and S44).

2-4. Writing to Temporary Block

Figure 11:
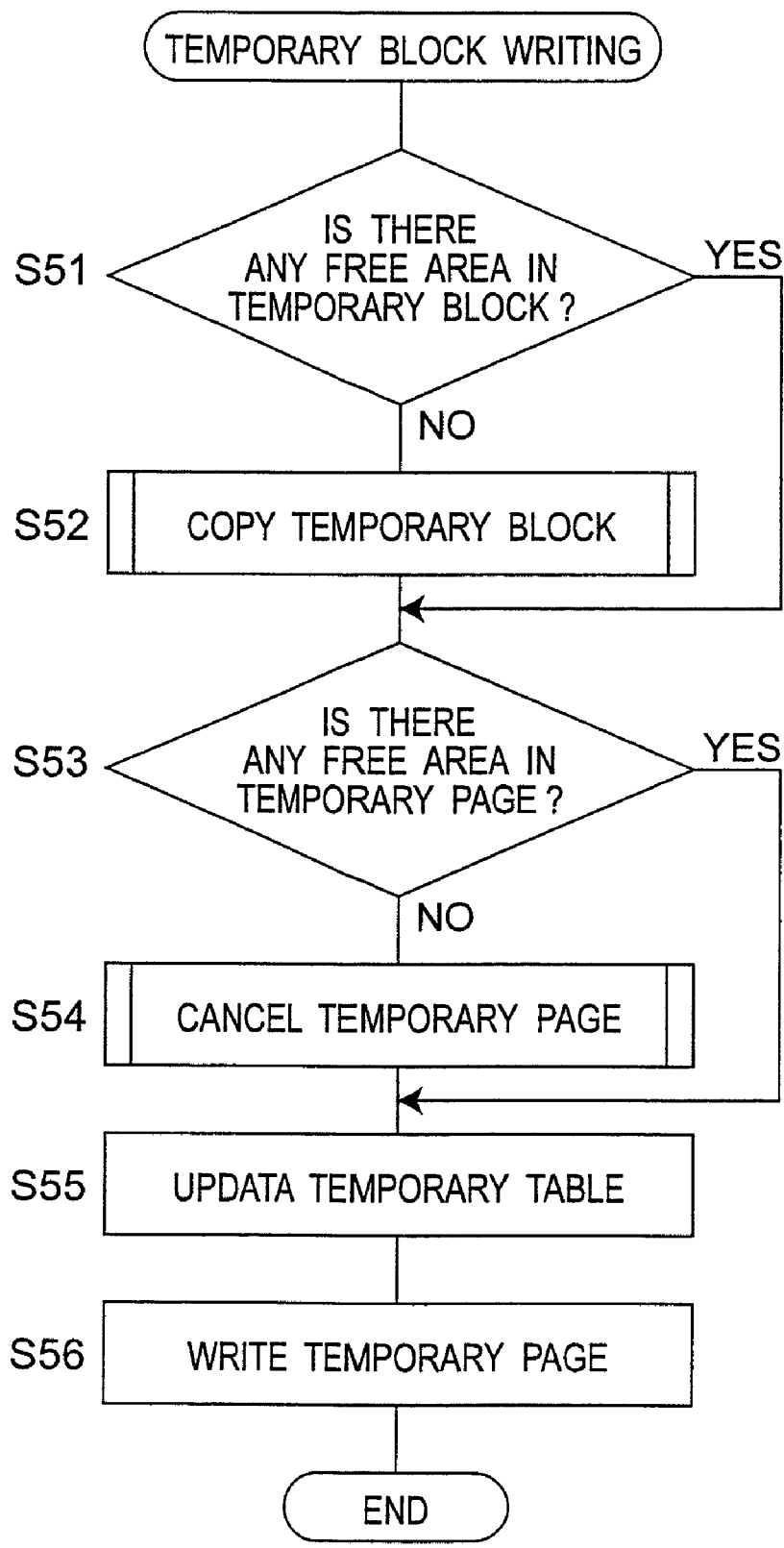
FIG. 11 is a flowchart of temporary block writing process.

Writing process (step S30 of FIG. 8) to the aforementioned temporary block 80 will be described with reference to the flowchart of FIG. 11.

Figure 12A:
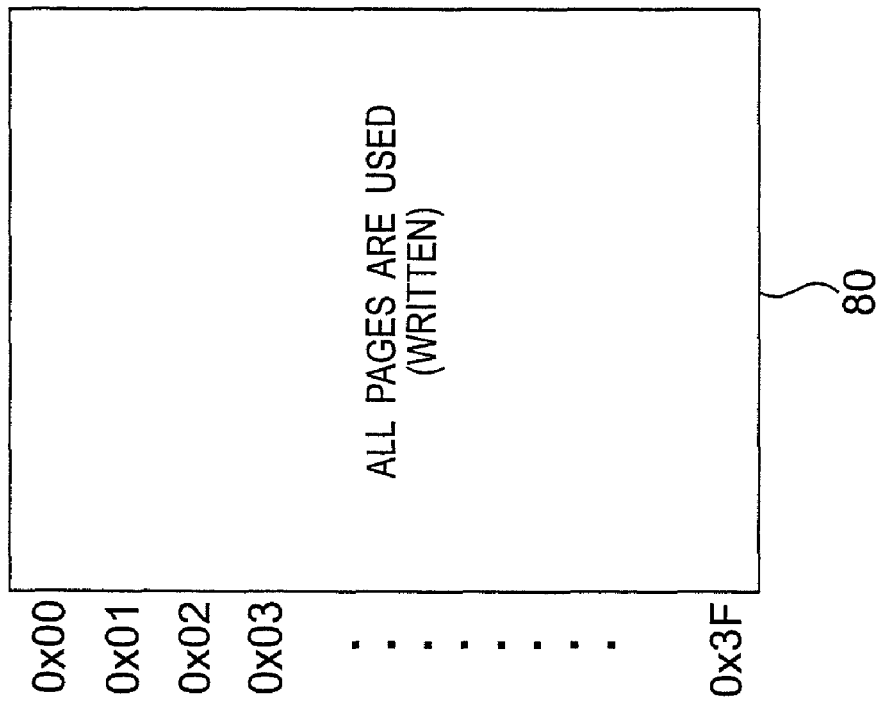
FIG. 12A is a view explaining a temporary block with no free area.

In order to perform writing of data to the temporary block 80, first, the controller 104 determines whether or not there is an free area in the temporary block 80 (S51). Here, the state where there is no free area is a state where there is no free area for newly writing the data because the data has already been written in all of the physical pages of the temporary block 80, as shown in FIG. 12A.

When there is no free area, temporary block copying process is performed (S52). In the temporary block copying process, the data of the valid physical page stored in the temporary block 80 having no free area is copied to a new physical block, and this new physical block is used as the temporary block 80, thus generating a free area. Details of this process will be described later.

Figure 12B:
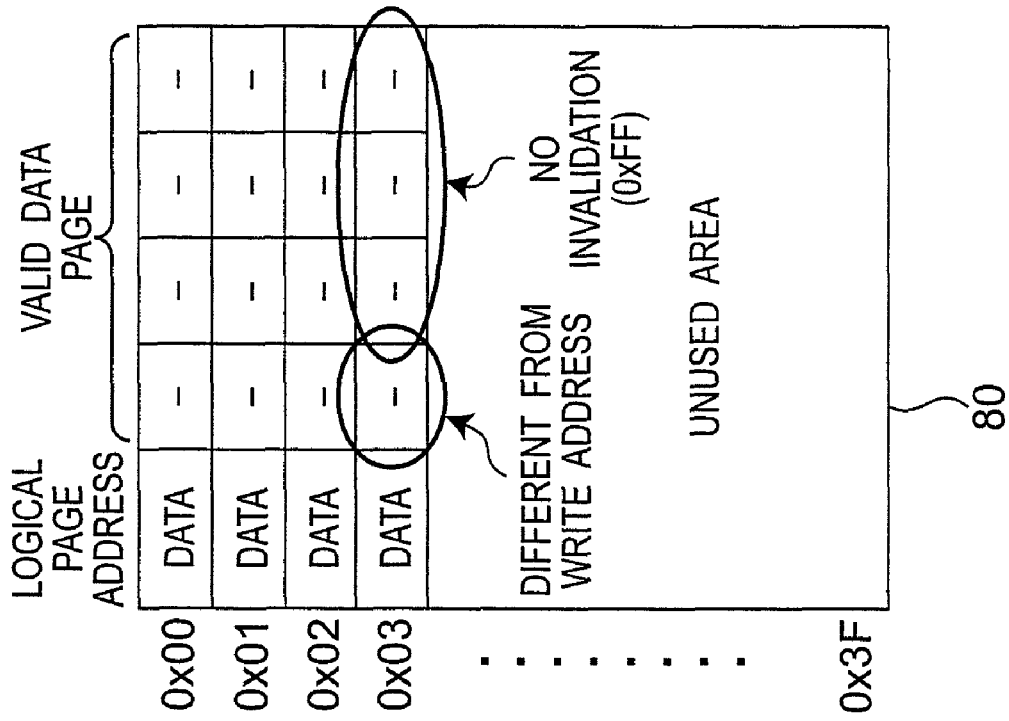
FIG. 12B is a view explaining the temporary block with no free temporary page.

Thereafter, the controller 104 determines whether or not there is a free area in four temporary pages of the temporary block 80 (S53). Here, the state where there is no free area in the temporary page is a state where, as shown in FIG. 12B, all of the temporary pages of the physical page address recorded in the fields of the four valid data pages are valid and the logical page address of the data to be written is not identical to any one of the logical page addresses of the four valid temporary pages.

When there is no free area in the temporary page, temporary page cancellation process is performed (S54). In the temporary page cancellation process, one valid temporary page registered earliest is canceled to create free space in the temporary page. Details of this process will be described later.

Then, after the temporary table 107 is updated (S55), the temporary page data is written in the temporary block 80 (S56).

2-4-1. Temporary Block Copying

Figure 13:
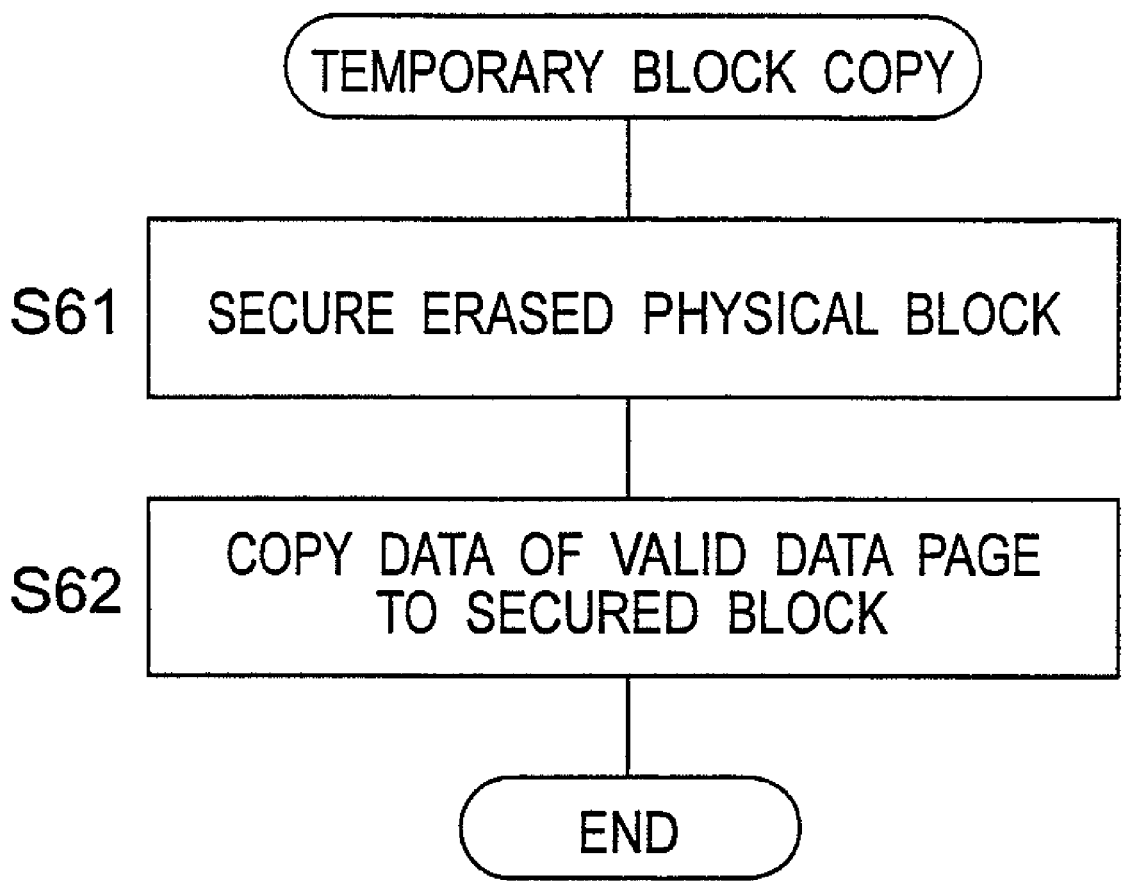
FIG. 13 is a flowchart of temporary block copying process.

The aforementioned temporary block copying process (step S52 of FIG. 11) will be described with reference to the flowchart of FIG. 13. In this process, only the data of the valid physical page in the temporary block 80 having no free area is copied to a new physical block, thereby creating free area in the temporary block.

First, the erased block table 105 is referenced and the erased physical block is secured (S61). The "erased physical block" is constituted of unused area of data. All the data of the valid physical page in the temporary block 80 having no free area in the temporary page is copied to the newly secured physical block (S62).

Figure 14:
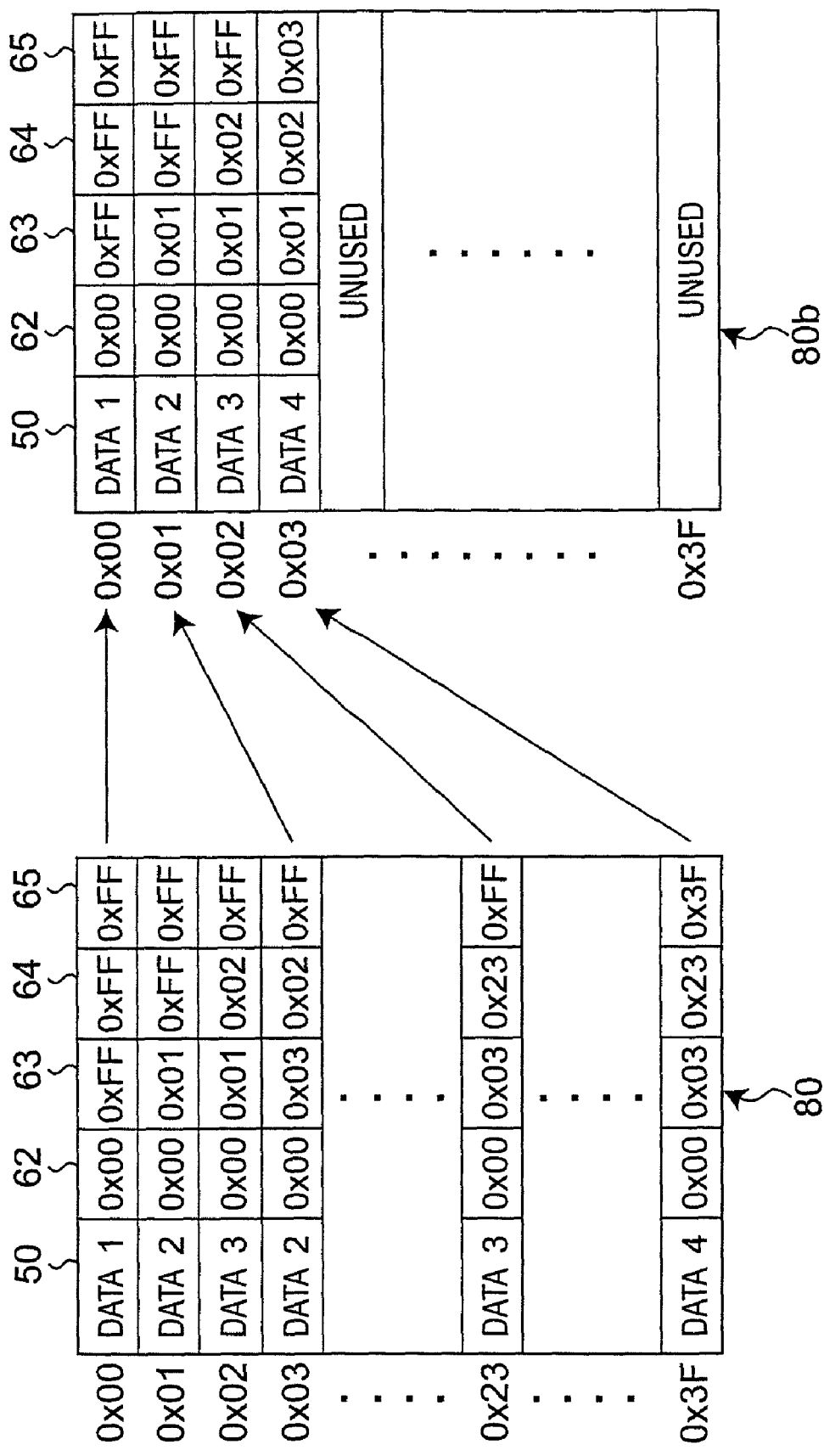
FIG. 14 is a view explaining the temporary block copying process.

FIG. 14 is a view explaining the temporary block copying process. The temporary block 80 is a physical block having no free area. Referring to the final page of the temporary block 80, the physical pages "0x00", "0x03", "0x23", "0x3F" can be recognized as the valid temporary pages. A physical block 80b is the newly secured erased physical block. The data of the physical pages "0x00", "0x03", "0x23", "0x3F" in the temporary block 80 are copied to the newly secured physical block 80b. The physical block 80b has a sufficient unused area, and it is used as a new temporary block, thereafter. The data of the old temporary block 80 is erased and the old temporary block 80 becomes the erased physical block.

2-4-2. Cancellation of Temporary Page

Figure 15A:
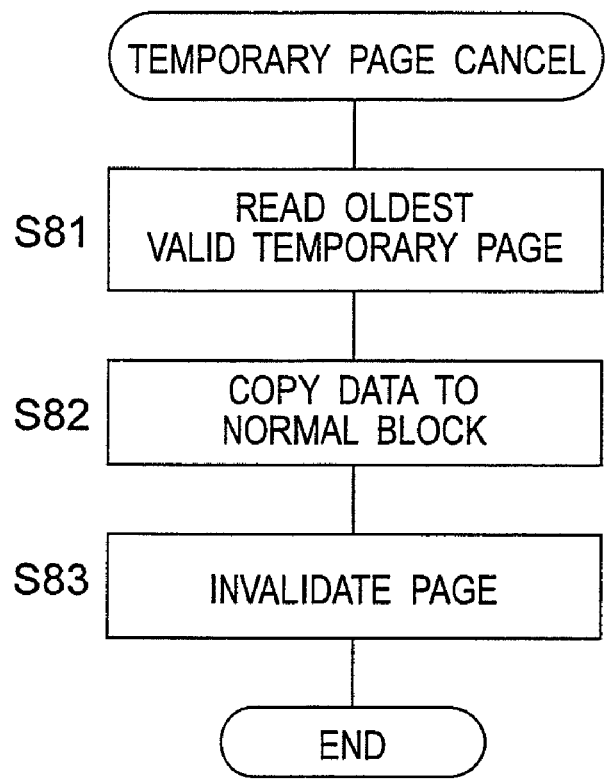
FIG. 15A is a flowchart of a temporary page cancellation process and FIG. 15B is a view for explaining the cancellation of the temporary page.

The aforementioned temporary page cancellation process (step S54 of FIG. 11) will be described with reference to the flowchart of FIG. 15A. In this process, a free temporary page is created by canceling the valid temporary page which is registered earliest.

First, the valid temporary page registered earliest is searched for, and its page data is read (S81). The page data thus read is copied to a normal block (S82). Thereafter, the invalidation process of the temporary page is performed for the temporary page whose page data is copied (S83).

Figure 15B:
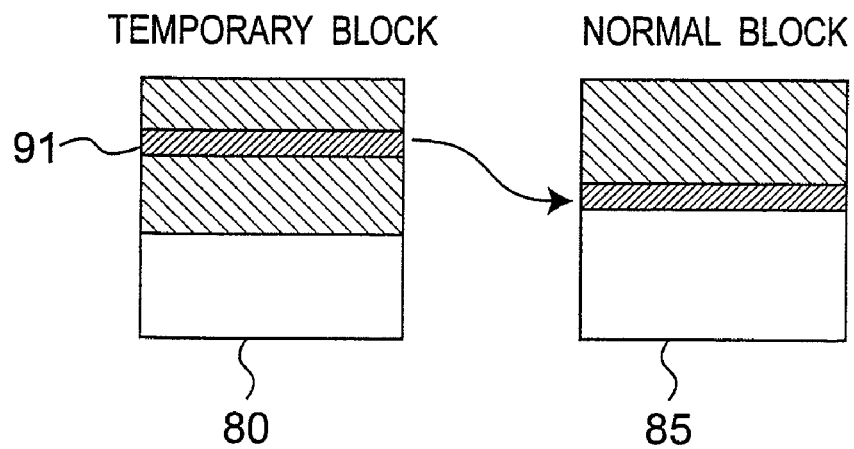

FIG. 15B is a view explaining the cancellation of the temporary page. The valid temporary page 91 registered earliest in the temporary block 80 is copied to a normal block 85. At this time, in the normal block 85, the data of the temporary page 91 together with the data having the logical address continued to the address of the data of the temporary page 91 is copied as necessary to the normal block 85, so that the continuity of the logical addresses is maintained.

3. Specific Example at the Time of Data Writing

3-1. Access Example 1 in a Method of the Invention

Transition of a state in the temporary block 80 at the time of writing data will be described with a specific example, with reference to FIGS. 16, 17, and 18. The data to be written is packetized in 4 KB (8 sectors), and as shown in FIG. 16B, includes data 1, data 2, data 3, and data 64, and the total size of the data is 128 KB (256 sectors).

Data 1 is written in the sectors 0 to 6 and a partial area of the sector 7. The data 2 is written in a remaining area of the sector 7. The data 3 is written in the sectors 8 to 14 and in an partial area of the sector 15. The data 4 is written in a remaining area of the sector 15. In the same way, the data 5, data 6, ..., and data 64 are written in the corresponding sectors.

Figure 16A:
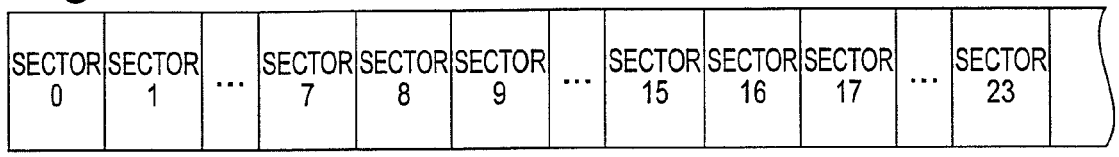
FIGS. 16A to 16C are views for explaining a first access example according to the present invention.
Figure 16B:
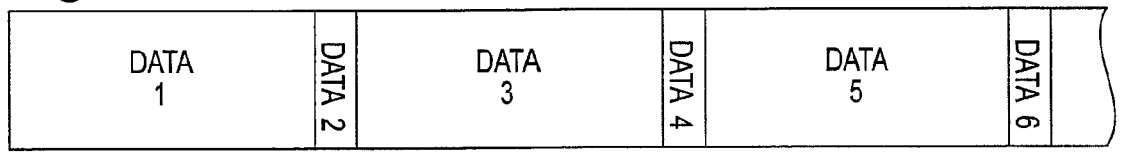
Figure 16C:
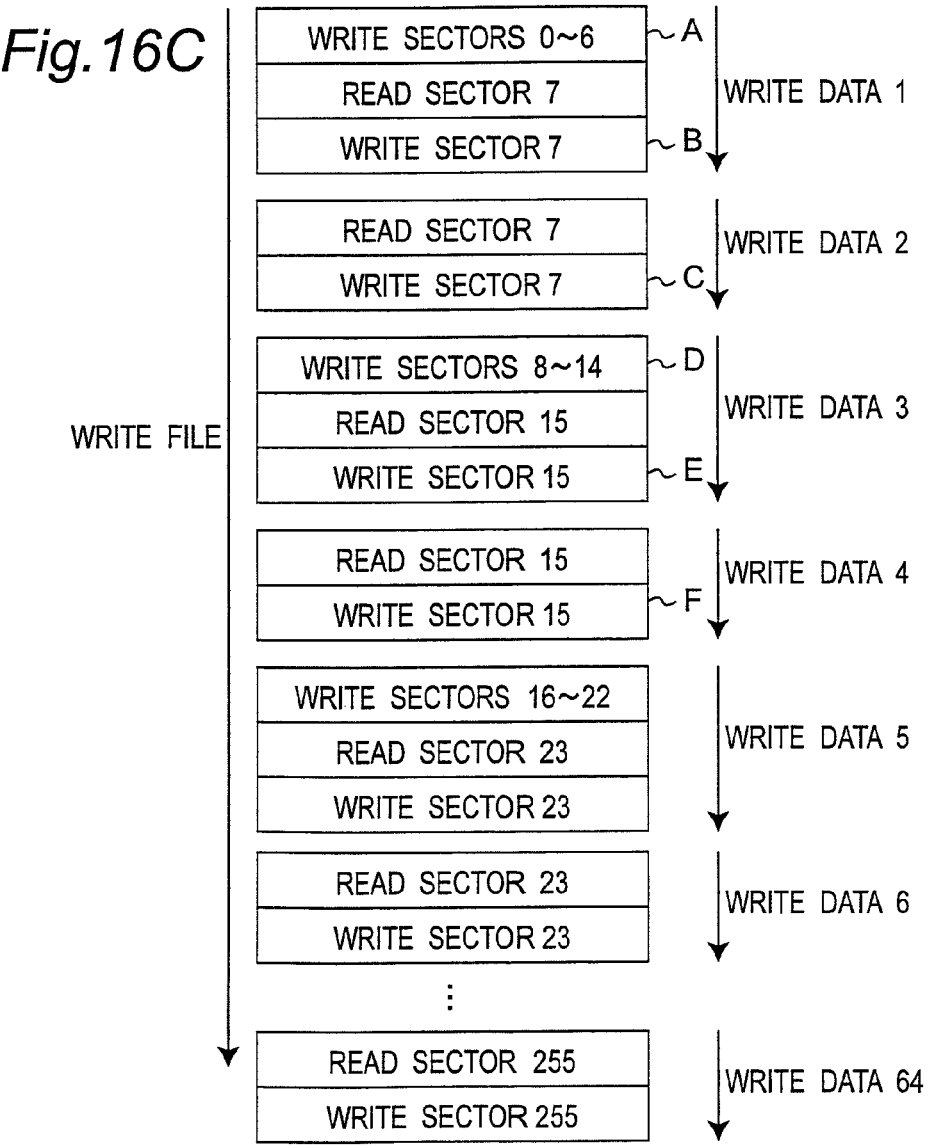

FIG. 16C shows an access procedure when a writing command of the data shown in FIG. 16B is received. In FIG. 16C, one block for writing/reading corresponds to one command from the host 102.

First, in writing of data 1, the data is written in the sectors 0 to 6. Next, the remaining data of the data 1 is written in a part of the sector 7. In this case, the data of the sector 7 is read, and the part of the sector 7 corresponding to the remaining data part of the data 1 is rewritten. In this way, when the data whose size is small than one sector, read-modify-write is executed in which sector data is read once and only a necessary part thereof is rewritten.

Next, in order to write the data 2 in the remaining area of the sector 7, the data of the sector 7 is read and the part of the sector 7 corresponding to the data part of the data 2 is rewritten. In the same way, the data 3 to data 64 are written.

FIGS. 17 and 18 are views explaining the transition of the state in the temporary block 80 and the normal block 90, when the data is written as shown in FIGS. 16A to 16C.

Figure 17A:
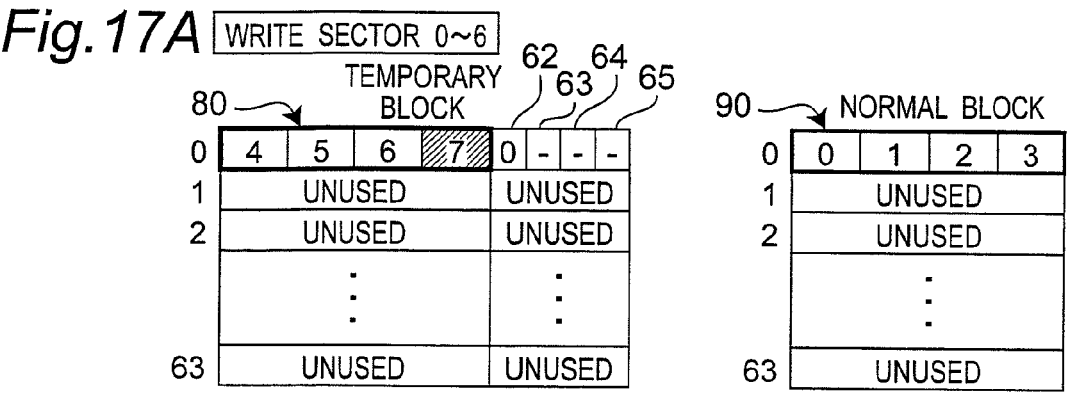
FIGS. 17A to 17D are views showing a transition of a state in the temporary block during writing of data, in the first access example.

FIG. 17A shows the state of the temporary block 80 and the normal block 90 after writing of the data 1 in the sectors 0 to 6, namely, after access A in FIG. 16C. The writing in the sectors 0 to 6 is divided into the writing in the sectors 0 to 3, and the writing in the sectors 4 to 6. The writing in the sectors 0 to 3 is to write data to the normal block 90 (S24) since it includes the final sector in one page ("Yes" in step S23 of FIG. 8). The writing in the sectors 4 to 6 is to write data to the temporary block 80 (S30) since it does not include the final sector in one page ("No" in step S23 of FIG. 8). The sectors 4 to 6 carrying a part of data 1 is recorded in the "data area" 50 at the physical page 0 of the temporary block, and the physical page address "0" is recorded in the valid data 0 page (field 62). At this time, the writing in the sector 7 is not performed yet. In addition, "0", being the physical page address of a new page, is recorded in the field of the "physical page address of valid data 0" of the temporary table 107, and "1", being the logical page address of the new page is recorded in the field of the "logical page address of data at physical page of valid data 0".

Figure 17B:
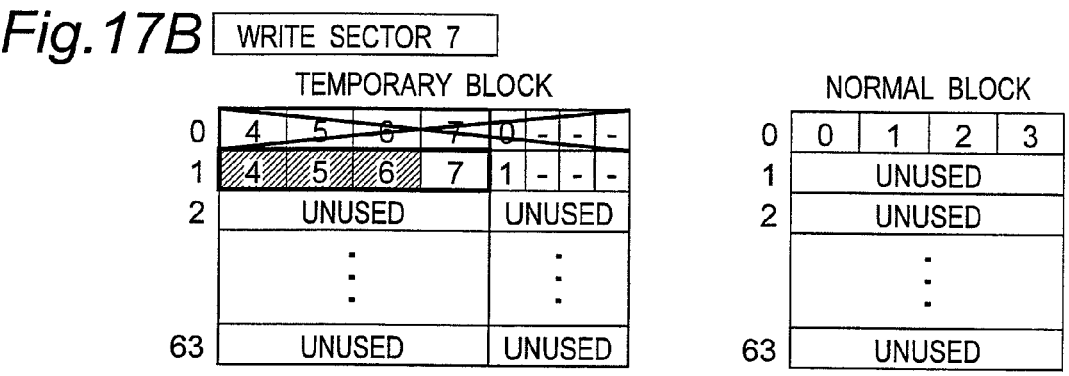

FIG. 17B shows the state of the temporary block 80 and the normal block 90 after writing of the remaining data of the data 1 in the sector 7, namely, after access B in FIG. 16C. Writing of one sector is made as the writing in the sector 7 ("Yes" in step S21 of FIG. 8), and therefore the writing to the temporary block 80 is made (S30). In order to write to the sector 7, the data (data of one page) of the sectors 4 to 7 is read, and the data of the sector 7 is rewritten with the remaining data of the data 1, and this rewritten data is newly recorded in the physical page address "1" as new temporary page data. At this time, the value of the valid data 0 page (field 62) is set to "1" which is the physical page address of the new page. In addition, "1", being the physical page address of the new page, is recorded in the field of the "physical page address of valid data 0" of the temporary table 107.

Figure 17C:
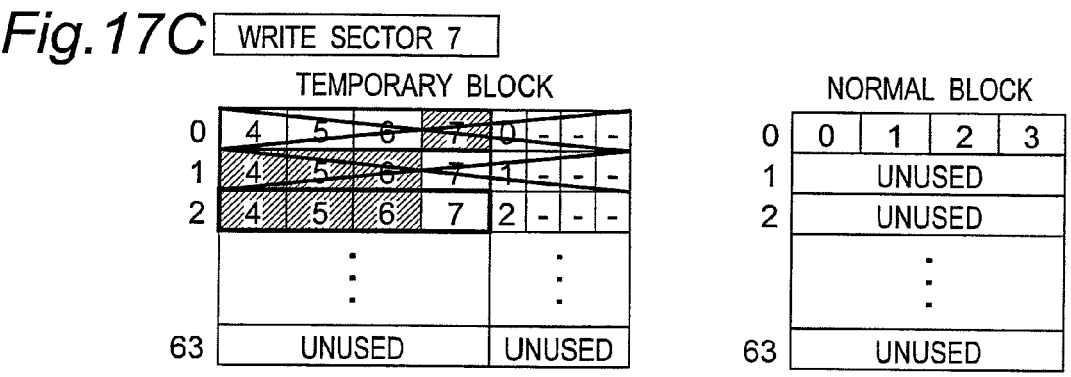

FIG. 17C shows the state of the temporary block 80 and the normal block 90 after writing of the data 2 in the sector 7, namely, after access C in FIG. 16C. Writing of one sector is performed as the writing in the sector 7, and therefore the writing to the temporary block 80 is performed. In order to perform writing in the sector 7, the data (data of one page) of the sectors 4 to 7 is read, and a part of data of the sector 7 is rewritten with the data of the data 2, and this rewritten data is recorded in the physical page address "2" as the new temporary page data. At this time, the value of the valid data 0 logical page is set to "2", which is the physical page address of the new page. In addition, "2", being the physical page address of the new page, is recorded in the field of the "physical page address of the valid data 0" of the temporary table 107.

Figure 17D:
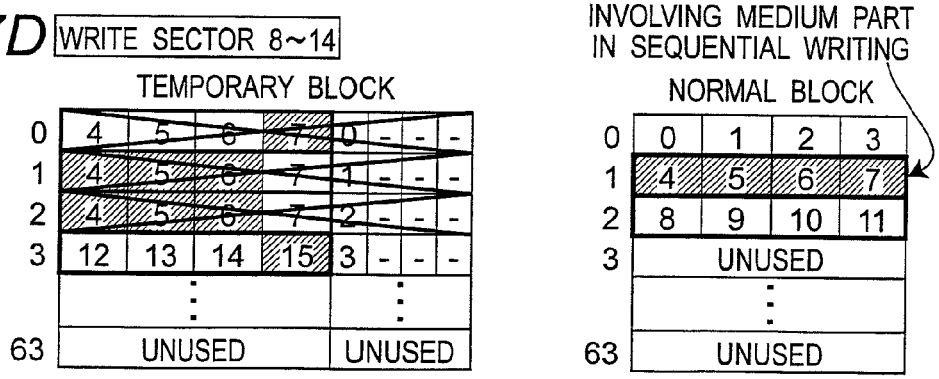

FIG. 17D shows the state of the temporary block 80 and the normal block 90 after writing of the data 3 in the sectors 8 to 14, namely, after access D in FIG. 16C. The writing in the sectors 8 to 14 is divided into the writing in the sectors 8 to 11, and the writing in the sectors 12 to 14. The writing in the sectors 8 to 11 is performed to the normal block 90 since it includes writing of the final sector in one page. Here, the data of the sectors 0 to 3 is already written in the normal block 90, and therefore it is necessary to write the data of the sectors 4 to 7 together before writing in the sectors 8 to 11 so as to maintain the continuity of the logical addresses.

After writing in the normal block 90 for the sectors 8 to 11, writing in the sectors 12 to 14 is performed. The writing in the sectors 12 to 14 is performed to the temporary block 80 since it does not include writing of the final sector in one page. The data of the sectors 12 to 14 is recorded in the physical page address "3". The value of the valid data 0 logical page (field 62) is set to "3". The value of the valid data 0 page (field 62) is overwritten from "2" to "3". This is because when data is written to the normal block 90 for the sectors 4 to 7, the data for the sectors 4 to 7 in the temporary block 80 should be invalidated. In addition, "3", which is the physical page address of the new page, is recorded in the field of the "physical page address of valid data 0" of the temporary table 107, and "3", which is the logical page address of the new page is recorded in the field of the "logical page address of data at physical page of valid data 0".

FIG. 18E shows the state of the temporary block 80 and the normal block 90 after the remaining data of the data 3 is written in the sector 15, namely, after access E in FIG. 16C. Writing of one sector is performed as the writing in the sector 15, and therefore writing in the temporary block 80 is performed. The data of the sectors 12 to 15 is read, and the data of the sector 15 is rewritten with the remaining data of the data 3, which is then recorded at the physical page address "4" as new temporary page data. At this time, the value (field 62) of the valid data 0 page is set to "4", which is the physical page address of the new page. In addition, "4", being the physical page address of the new page is recorded in the field of the "physical page address of valid data 0" of the temporary table 107.

FIG. 18F shows the state of the temporary block 80 and the normal block 90 after the data 4 is written in the sector 15, namely, after access F in FIG. 16C. Writing of one sector is performed as the writing in the sector 15, and therefore writing in the temporary block 80 is performed. The data of the sectors 12 to 15 is read and a part of the data of the sector 15 is rewritten with the data of the data 4, which is then recorded at the physical page address "5" as new temporary page data. At this time, the value (field 62) of the valid data 0 logical page is set to "5", which is the physical page address of the new page. In addition, "5", being the physical page address of the new page, is recorded in the field of the "physical page address of valid data 0" of the temporary table 107.

In the way above-described, writing can be performed in the normal block 90, by accesses of seven sectors, one sector, and one sector, such as writing (access A) in the sectors 0 to 6, writing (access B) in the sector 7, and writing (access C) in the sector 7. In this case, the access of three pages is generated for the temporary block 80 by accesses of eight sectors (sectors 0 to 7).

Therefore, when similar accesses of 256 sectors are repeated, the accesses of 96 (256÷8×3) pages to the temporary page are generated. 96 pages cannot be stored in one temporary block 80, and therefore one temporary copying process occurs. As a result, writing can be performed by using the physical block of three blocks or less.

3-2. Example of Access by Conventional Method

Explanation will be given to the transition of the state in the physical block when the data shown in FIGS. 16A and 16B is written by a conventional writing method, with reference to FIGS. 19 and 20.

As shown in FIG. 19A, in the physical block (normal block) #1, the data of the sectors 0 to 3 is written in page 0, and the data of the sectors 4 to 6 is written in page 1, respectively. Next, the remaining data of the data 1 is written in the sector 7. However, writing in the sector 7 needs to be performed by writing the data of the sectors 4 to 7 in another new page, because it is not possible to perform overwriting on the page 1. Therefore, writing is performed by the conventional method as shown in FIG. 19B. Namely, in order to maintain the continuity of the logical addresses, the data of the sector 8 to sector 255 continued from the sector 7 is written in the unused area of the physical block #1, and the data of the sectors 0 to 3 and the sectors 4 to 7 is written in another physical block #2. At this time, the logical address and the physical address are related by the logical-physical address conversion table.

Next, when the sector 7 is overwritten for the data 2, in the same way as described above, the data of the sectors 8 to 255 continued from the sector 7 is written in the unused area of the physical block #2, and the data of the sectors 0 to 3 and of sectors 4 to 7 is written in another physical block #3 (see FIG. 19C).

Next, the data of the sectors 8 to 14 is written in the physical block #3 (see FIG. 19D). Thereafter, the sector 15 is written with the remaining data of the data 3. In this case, in the same way as in the case of writing the remaining data of the data 1 in the sector 7, the data of the sectors 0 to 15 is written in a new physical block #4 after the data is copied to the physical block #3, so that the continuity of the logical address is maintained (see FIG. 20E).

Further, the data of the data 4 is written in the sector 15. In this case also, in the same way as in the case of writing the data of the data 2 in the sector 7, the data of the sectors 0 to 15 is written in a new physical block #5 after the data is copied to the physical block #4, so that the continuity of the logical address is maintained (see FIG. 20F).

As described above, according to the conventional method, in the accesses of seven sectors, one sector and one sector, three blocks are consumed in the first accesses of the seven sectors, one sector and one sector, and two blocks are consumed in the accesses of subsequent seven sectors, one sector and one sector. Accordingly, when writing is performed up to 255 sectors, 65 (256÷8×2+1) blocks are consumed.

According to the conventional technique, 65 blocks are consumed in writing of 255 sectors. Meanwhile, according to the method of this embodiment, as described in the access example 1, only three blocks are consumed. Therefore, according to this embodiment, block consumption amount is about one-twentieth of the conventional amount, and the number of copying of data between physical blocks can be reduced, thus making it possible to accelerate the writing process.

3-3. Accesses Example 2 in a Method of the Invention

Figure 21A:
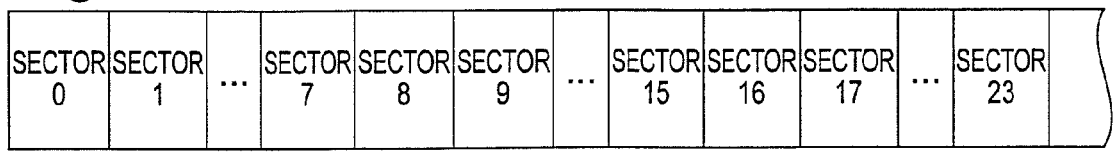
FIGS. 21A to 21C are views for explaining a second access example according to the present invention.
Figure 21B:
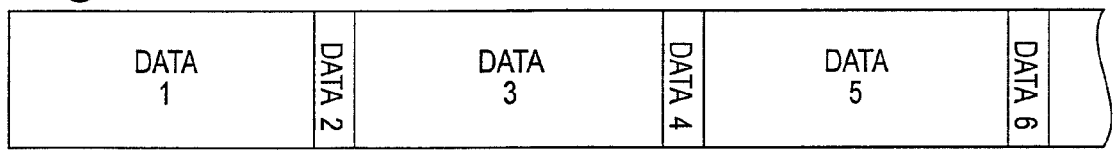
Figure 21C:
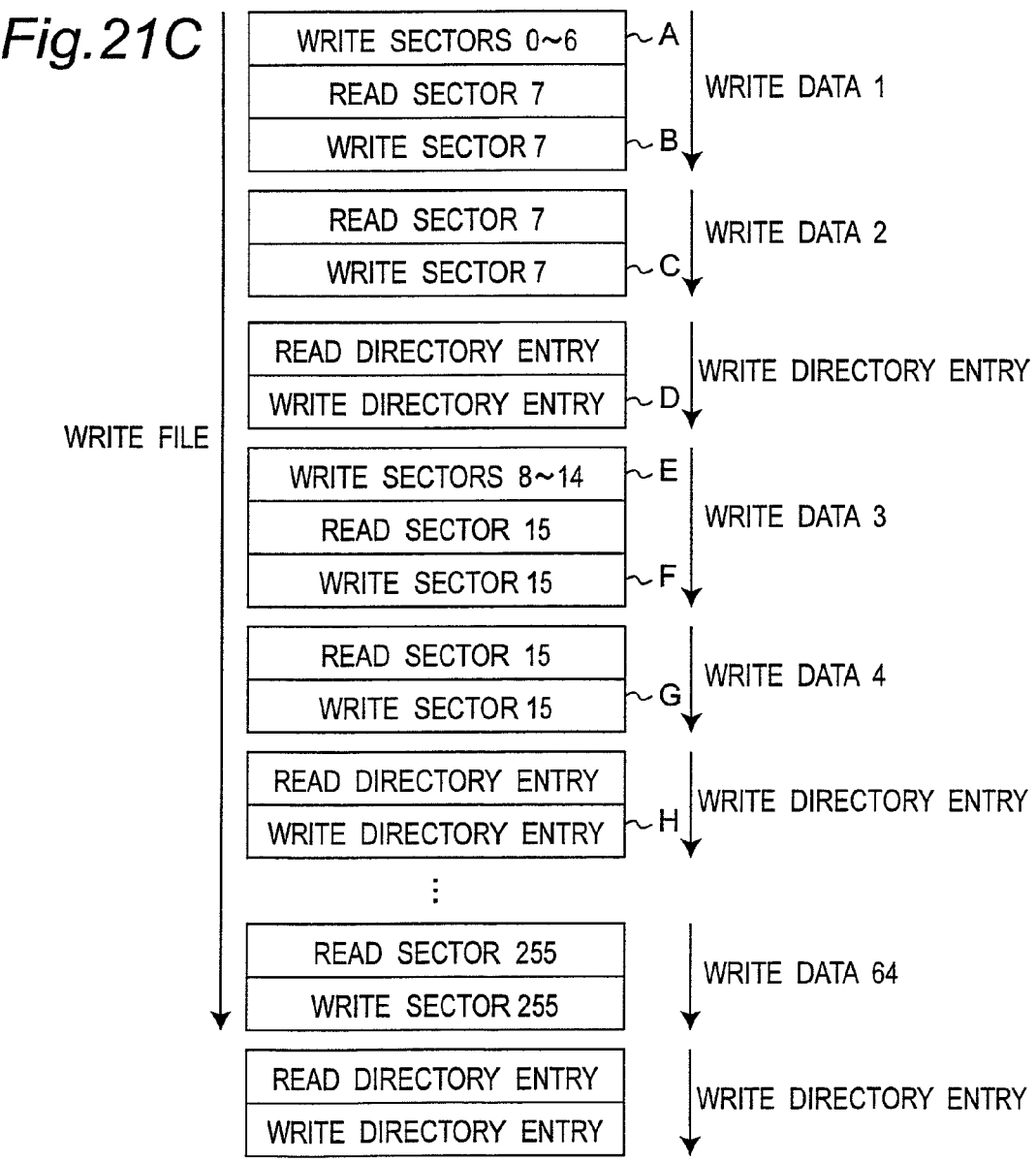
Figure 22A:
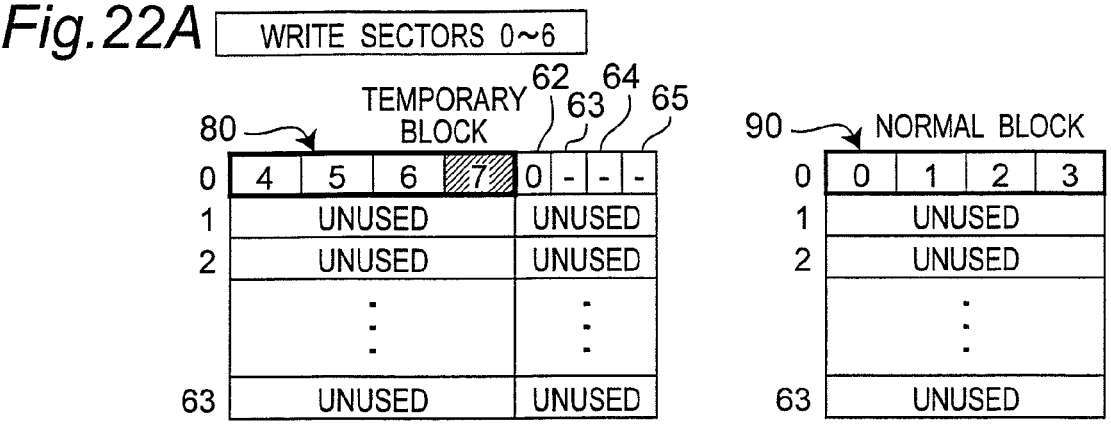
FIGS. 22A to 22D are views showing a transition of a state in a temporary block during writing of data in the second access example.
Figure 22B:
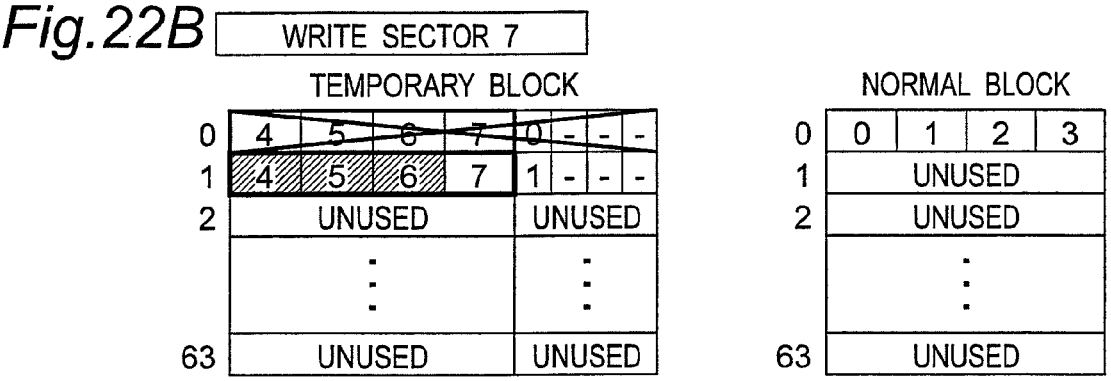
Figure 22C:
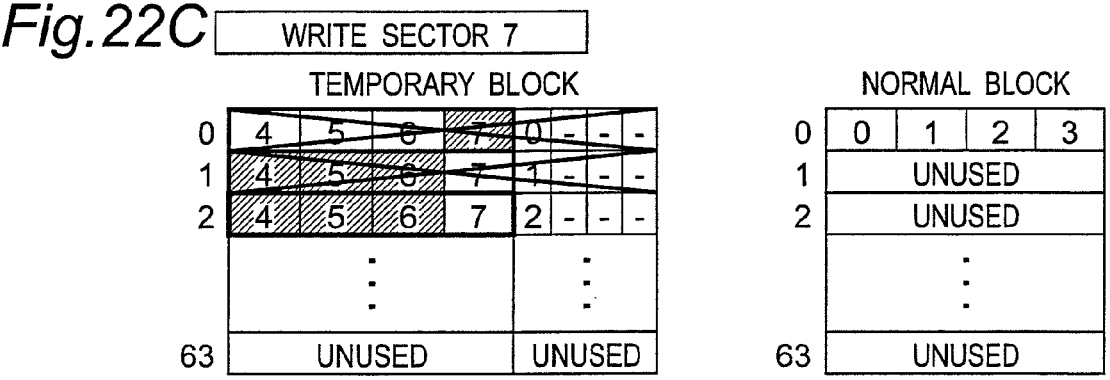
Figure 22D:
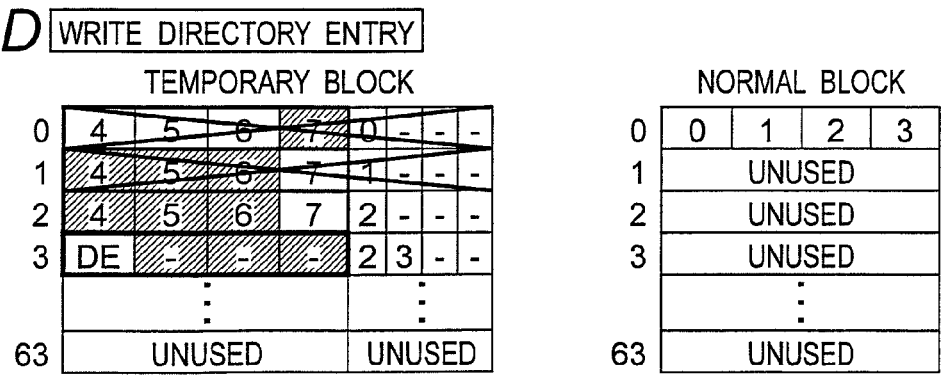

In the example described below, explanation will be given to a case where the access to directory entry occurs per each packet unit, namely, for each writing of data by accesses of seven sectors, one sector and one sector, as shown in FIG. 21C.

FIGS. 22, 23, and 24 show the views illustrating the transition of the state of the temporary block 80 and the normal block 90, in the case of data writing including the data writing to the directory entry as shown in FIG. 21C.

The transition of the state of the temporary block 80 and the normal block 90 is basically the same as the change shown in FIGS. 17 and 18. The data size of the directory entry is one sector, and therefore the data of the directory entry is written in the temporary block 80 (see FIGS. 22D and 24).

In this way, by updating the directory entry in packet unit, even when a failure occurs during writing of data, it is possible to prevent fault such as becoming completely incapable of managing the already written data, and management can be performed for the data with which the directory entry is updated. Such a merit is desired for a mobile terminal, for example.

In addition, it is also possible to determine whether or not the data is written in the directory entry based on the address of the data to be written. Therefore, when the address of the data to be written is determined and this address corresponds to the directory entry, the data may be written in the temporary block 80 unconditionally.

4. Conclusion

As described above, according to this embodiment, in the nonvolatile memory having the flash memory in which writing must be performed in a predetermined writing unit (page unit), data is written in the physical block (temporary block) different from the physical block used in the normal writing operation, in writing of the data having smaller size than a predetermined writing unit (page unit). Thus, the number of copying of data between physical blocks in writing of data can be reduced, and as a result, the writing process can be accelerated.

INDUSTRIAL APPLICABILITY

The present invention can be applied to a technique of accelerating writing process for a nonvolatile semiconductor device, and is particularly useful for a nonvolatile semiconductor device having a nonvolatile memory in which writing must be performed in a predetermined writing unit (such as page unit), and a controller device, etc, of the nonvolatile memory.

The invention claimed is:

1. A nonvolatile memory device to which data is written based on a logical address, comprising:
a nonvolatile memory in which the data is written based on a physical address corresponding to the logical address, and which includes a plurality of physical blocks, each of the plurality of physical blocks including a plurality of pages, each of the plurality of pages being a predetermined writing unit,
the nonvolatile memory including a normal block which is a physical block that stores data independently of a size of the data, and a temporary block which is a physical block that stores less than a page of data;
a logical-physical address conversion table for storing correspondence information between a logical address and a physical address of the at least one page of data stored in the normal block; and
a temporary table for storing correspondence information between a logical address and a physical address regarding the data stored in the temporary block,
wherein the temporary block includes plural pages each of which includes data of the less than the page of data, the plural pages include plural valid pages, the plural valid pages include a specific valid page that contains data of the less than the page of data and management information including plural pointers that points to the valid pages in the temporary block, the management information includes a pointer to the specific valid page and pointers to valid pages other than the specific valid page.

2. The nonvolatile memory device according to claim 1, wherein data writing for one page in the temporary block occurs only once.

3. The nonvolatile memory device according to claim 1, wherein the nonvolatile memory is a multivalued memory cell.

4. The nonvolatile memory device according to claim 1, wherein the plurality of physical blocks are managed as one physical super block,
a plurality of logical blocks corresponding to the physical super block are managed as a logical super block, and
the logical-physical address conversion table stores correspondence information between the physical super block and the logical super block.

5. The nonvolatile memory device according to claim 1, further comprising:
a controller that invalidates a current valid page by overwriting a value of the management information indicating the current valid page with another value.

6. The nonvolatile memory device according to claim 1, further comprising:
a controller for controlling access to the nonvolatile memory,
wherein a page is composed of a plurality of sectors, and when the size of the data requested to be written is one sector or when a last sector of the data to be written is not a final sector in the page, the controller writes the data requested to be written in the temporary block.

7. The nonvolatile memory device according to claim 1, wherein the normal block stores data independently of a size of the data when writing of the data includes writing data in a final sector of a new page, and the temporary block stores data less than a page of data when writing of the data does not include writing data in the final sector of the new page.

8. The nonvolatile memory device according to claim 1, wherein when data has been written into all of the physical pages of the temporary block, the controller secures a different physical block in the nonvolatile memory that has had all previous data erased therefrom, copies only the data of the valid physical pages in the temporary block to the different physical block, and erases all of the data in the temporary block, the different physical block thereafter functioning as a new temporary block.

9. A memory controller for controlling an operation of a nonvolatile memory device including a nonvolatile memory in which data is written based on a logical address,
wherein the data is written to the nonvolatile memory based on a physical address corresponding to the logical address, the nonvolatile memory includes a plurality of physical blocks, each of the plurality of physical blocks including a plurality of pages, each of the plurality of pages being a predetermined writing unit, and the nonvolatile memory device including a temporary block which is a physical block storing less than a page of the data, and a normal block which is a physical block storing the data independently of a size of the data,
the memory controller comprises:
a logical-physical address conversion table for storing correspondence information between a logical address and a physical address of the at least one page of data stored in the normal block;

a temporary table for storing correspondence information between a logical address and a physical address regarding the data stored in the temporary block, and a controller for controlling access to the nonvolatile memory, wherein, the temporary block includes plural pages each of which includes data of the less than the page of data, the plural pages include plural valid pages, the plural valid pages include a specific valid page that contains data of the less than the page of data and management information including plural pointers that points to the valid pages in the temporary block, the management information includes a pointer to the specific valid page and pointers to valid pages other than the specific valid page, the controller determines which physical block to write the data to according to a size of data requested to be written, and writes the data requested to be written and the management information in the temporary block, when the size of the data requested to be written is less than a page.

10. The memory controller according to claim 9, wherein data writing for one page in the temporary block occurs only once.

11. The memory controller according to claim 9, wherein the nonvolatile memory is a multivalued memory cell.

12. The memory controller according to claim 9, wherein the plurality of physical blocks are managed as one physical super block, a plurality of logical blocks corresponding to the physical super block are managed as a logical super block, and the logical-physical address conversion table stores correspondence information between the physical super block and the logical super block.

13. The memory controller according to claim 9, wherein the controller invalidates a current valid page by overwriting a value of the management information indicating the current valid page with another value.

14. The memory controller according to claim 9, wherein a page is composed of a plurality of sectors, and when the size of the data requested to be written is one sector or when a last sector of the data to be written is not a final sector in the page, the controller writes the data requested to be written in the temporary block.

15. The memory controller according to claim 9, wherein the normal block stores data independently of a size of the data when writing of the data includes writing data in a final sector of a new page, and the temporary block stores data less than a page of data when writing of the data does not include writing data in the final sector of the new page.

16. The memory controller according to claim 9, wherein when data has been written into all of the physical pages of the temporary block, the controller secures a different physical block in the nonvolatile memory that has had all previous data erased therefrom, copies only the data of the valid physical pages in the temporary block to the different physical block, and erases all of the data in the temporary block, the different physical block thereafter functioning as a new temporary block.

17. A data reading method for a nonvolatile memory device from which data is read based on a logical address, wherein the nonvolatile memory device comprises:

a nonvolatile memory from which the data is read based on a physical address corresponding to the logical address, and which includes a plurality of physical blocks, each of the plurality of physical blocks including a plurality of pages, each of the plurality of pages being a predetermined writing unit, the nonvolatile memory including a normal block which is a physical block storing data independently of a data size and a temporary block which is a physical block storing less than a page of data;

a logical-physical address conversion table for storing correspondence information between a logical address and a physical address of the at least one page of data stored in the normal block; and a temporary table for storing correspondence information between a logical address and a physical address regarding the data stored in the temporary block, the temporary block includes plural pages each of which includes data of the less than the page of data, the plural pages include plural valid pages, the plural valid pages include a specific valid page that contains data of the less than the page of data and management information including plural pointers that points to the valid pages in the temporary block, the management information includes a pointer to the specific valid page and pointers to valid pages other than the specific valid page, and the reading method comprises:

referring to the temporary table when receiving a request for reading data; and either reading the data and the management information from the temporary block when a reading address has been registered in the temporary table, or reading the data with reference to the logical-physical address conversion table when the reading address has not been registered in the temporary table.

18. The data reading method according to claim 17, wherein a valid page in the temporary block is determined based on the management information.

19. The data reading method according to claim 17, wherein the normal block stores data independently of a size of the data when writing of the data includes writing data in a final sector of a new page, and the temporary block stores data less than a page of data when writing of the data does not include writing data in the final sector of the new page.

20. The data reading method according to claim 17, wherein when data has been written into all of the physical pages of the temporary block, the controller secures a different physical block in the nonvolatile memory that has had all previous data erased therefrom, copies only the data of the valid physical pages in the temporary block to the different physical block, and erases all of the data in the temporary block, the different physical block thereafter functioning as a new temporary block.

21. A data writing method for a nonvolatile memory device to which data can be written based on a logical address, wherein the nonvolatile memory device includes:

a nonvolatile memory in which data is written based on a physical address corresponding to the logical address, and which includes a plurality of physical blocks, each of the physical blocks including a plurality of pages, each page of the plurality of pages being a predetermined writing unit, the nonvolatile memory including a normal block which is a physical block that stores data independently of a size of the data and a temporary block which is a physical block storing less than a page of the data; and a logical-physical address conversion table for storing correspondence information between a logical address and a physical address of data stored in the physical block, wherein, the temporary block includes plural pages each of which includes data of the less than the page of data, the plural pages include plural valid pages, the plural valid pages include a specific valid page that contains data of the less than the page of data and management information including plural pointers that points to the valid pages in the temporary block, the management information includes a pointer to the specific valid page and pointers to valid pages other than the specific valid page;

the writing method comprises:

receiving a request for writing data from outside; and writing data requested to be written based on a page unit, wherein the management information and a portion of the data requested to be written that is less than a page is written in the temporary block.

22. The data writing method according to claim 21,
wherein a current valid page is invalidated by overwriting a value of the management information indicating the current valid page with another value.

23. The data writing method according to claim 21,
wherein a page is composed of a plurality of sectors, and when a size of the data requested to be written is one sector or when a last sector of the data to be written is not a final sector in the page, the data requested to be written is written in the temporary block.

24. The data writing method according to claim 21, wherein the normal block stores data independently of a size of the data when writing of the data includes writing data in a final sector of a new page, and the temporary block stores data less than a page of data when writing of the data does not include writing data in the final sector of the new page.

25. The data writing method according to claim 21,
wherein when data has been written into all of the physical pages of the temporary block, the controller secures a different physical block in the nonvolatile memory that has had all previous data erased therefrom, copies only the data of the valid physical pages in the temporary block to the different physical block, and erases all of the data in the temporary block, the different physical block thereafter functioning as a new temporary block.

* * * * *

UNITED STATES PATENT AND TRADEMARK OFFICE
CERTIFICATE OF CORRECTION

PATENT NO. : 8,307,149 B2
APPLICATION NO. : 11/912700
DATED : November 6, 2012
INVENTOR(S) : Toshiyuki Honda et al.

Page 1 of 1

It is certified that error appears in the above-identified patent and that said Letters Patent is hereby corrected as shown below:

On the Title Page, Item (54), and in the Specifications, column 1, lines 1-5, Title of the Invention, "NONVOLATILE MEMORY DEVICE INCLUDING A LOGICAL-TO-PHYSICAL LOGIG-TO-PHYSICAL ADDRESS CONVERSION TABLE, A TEMPORARY BLOCK AND A TEMPORARY TABLE" should read -- NONVOLATILE MEMORY DEVICE INCLUDING A LOGICAL-TO-PHYSICAL ADDRESS CONVERSION TABLE, A TEMPORARY BLOCK AND A TEMPORARY TABLE --.

Signed and Sealed this
Fourteenth Day of May, 2013

Teresa Stanek Rea
*Acting Director of the United States Patent and Trademark Office*